(12) United States Patent
Choi et al.

(10) Patent No.: US 8,744,463 B2
(45) Date of Patent: Jun. 3, 2014

(54) METHOD FOR TRANSMITTING A SIGNAL FOR A LOCATION-BASED SERVICE IN A WIRELESS COMMUNICATION SYSTEM, AND APPARATUS FOR SAME

(75) Inventors: Jin Soo Choi, Anyang-si (KR); Jin Sam Kwak, Anyang-si (KR); Han Gyu Cho, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/377,731

(22) PCT Filed: Jun. 28, 2010

(86) PCT No.: PCT/KR2010/004178
§ 371 (c)(1),
(2), (4) Date: Dec. 12, 2011

(87) PCT Pub. No.: WO2011/002188
PCT Pub. Date: Jan. 6, 2011

(65) Prior Publication Data
US 2012/0088515 A1    Apr. 12, 2012

Related U.S. Application Data

(60) Provisional application No. 61/221,082, filed on Jun. 28, 2009.

(51) Int. Cl.
*H04W 72/00* (2009.01)

(52) U.S. Cl.
USPC ............ 455/450; 455/414.2; 455/456.1; 455/456.2

(58) Field of Classification Search
USPC ............... 455/450, 456.1–456.3, 414.2
See application file for complete search history.

(56) References Cited

U.S. PATENT DOCUMENTS

| | | | | |
|---|---|---|---|---|
| 6,275,186 | B1 * | 8/2001 | Kong | 342/363 |
| 7,376,428 | B2 * | 5/2008 | Hottinen | 455/456.1 |
| 2008/0102846 | A1 | 5/2008 | Kim et al. | |
| 2010/0317343 | A1 * | 12/2010 | Krishnamurthy et al. | 455/435.1 |
| 2013/0217401 | A1 * | 8/2013 | Edge et al. | 455/450 |

OTHER PUBLICATIONS

Woonhaing Hur et al., "Incremental Redundancy Low-Density Parity Check Codes for MIMO V-BLAST Systems", 2006 IEEE, pp. 829-834, See abstract; Fig. 4; p. 830 right column, line 9-p. 832, right column, line 2.

* cited by examiner

*Primary Examiner* — Temica M Beamer
(74) *Attorney, Agent, or Firm* — McKenna Long & Aldridge LLP

(57) ABSTRACT

The present invention relates to a wireless communication system. Particularly, in configuring a location estimation subframe for determining the location of a terminal in a wireless communication system, the present invention involves replacing a portion of repeating patterns of a channel estimation pilot in the location estimation subframe with a location estimation pilot. In this way, the present invention is capable of transmitting a location estimation reference signal for a location-based service to the terminal while minimizing influences on an existing wireless frame structure.

14 Claims, 26 Drawing Sheets

METHOD FOR TRANSMITTING A SIGNAL FOR A LOCATION-BASED SERVICE IN A WIRELESS COMMUNICATION SYSTEM, AND APPARATUS FOR SAME

This application is a 35 U.S.C. §371 National Stage entry of International Application No. PCT/KR2010/004178, filed on Jun. 28, 2010, and claims the benefit of U.S. Provisional Application No. 61/221,082, filed Jun. 28, 2009, each of which are hereby incorporated by reference in their entireties as if fully set forth herein.

TECHNICAL FIELD

The present invention relates to a wireless communication system, and more particularly, to a method and an apparatus for transmitting reference location signals at a base station for location based services in a wireless communication system, and a method and an apparatus for measuring a location of a user equipment by receiving the signals.

BACKGROUND ART

A geographical location of a user equipment is calculated by basically measuring a delay time of signals transmitted from a plurality of cells. Accordingly, in order to measure a location of a user equipment, at least three or more signals are required. Based on this, various methods for calculating a location of a user equipment are provided. It is general that an observed time difference of arrival (OTDOA) scheme is mainly used.

FIG. 1 is a conceptual view illustrating an OTDOA scheme for measuring a location of a user equipment.

Referring to FIG. 1, the OTDOA scheme is to measure a location of a user equipment by using the difference in timing of signals transmitted from respective cells to the user equipment. The user equipment measures a delay time of each signal received from each cell and reports the measured delay times to a serving cell or an anchor cell. The serving cell measures a location of the corresponding user equipment by using the reported delay times.

Meanwhile, in order to provide a communication service of high quality, the need of a location measurement scheme for determining a location of a user equipment within a network and/or locations of entities related to the user equipment more exactly has been increased. In this respect, an advanced method for determining a location while minimizing an effect on a structure of an existing radio frame should be provided.

DISCLOSURE

Technical Problem

An object of the present invention is to provide a method for transmitting a location measurement signal for location based service while minimizing an effect on a structure of an existing radio frame.

Another object of the present invention is to provide a method for allocating a location measurement signal for location based service to a superframe while minimizing an effect on a reference signal and a control signal, which are allocated to an existing radio frame.

It is to be understood that objects to be achieved by the present invention are not limited to the aforementioned objects and other objects which are not mentioned will be apparent to those of ordinary skill in the art to which the present invention pertains from the following description.

Technical Solution

The present invention relates to a wireless communication system. Particularly, the present invention involves replacing a portion of repeating patterns of a channel estimation pilot in a location measurement subframe with a location measurement pilot in configuring the location measurement subframe for determining the location of a terminal in a wireless communication system.

According to one aspect of the present invention, a method for transmitting a location measurement signal, by which a base station transmits a location measurement subframe for location based services to a UE in a wireless communication system includes allocating a location measurement pilot to at least one resource unit in the location measurement subframe; and transmitting the location measurement subframe to the UE, wherein the location measurement pilot is allocated to part of repeating patterns of a channel estimation pilot in the at least one resource unit.

According to another aspect of the present invention, a base station which transmits a location measurement subframe for location based services in a wireless communication system, the base station includes a transmitter configured to transmit a radio signal to a UE; and a processor configured to control the transmitter to allocate a location measurement pilot to at least one resource unit in the location measurement subframe and to control the transmitter to transmit the location measurement subframe to the UE, wherein the processor controls the transmitter to allocate the location measurement pilot to part of repeating patterns of a channel estimation pilot in the at least one resource unit.

According to another aspect of the present invention, a method for determining a location of a UE in a wireless communication system includes receiving at least one location measurement subframe for determination of the location of the UE from each of a plurality of base stations; and determining the location of the UE on the basis of a location measurement pilot allocated to the location measurement subframe received from each base station, wherein the location measurement pilot is allocated to part of repeating patterns of a channel estimation pilot in at least one resource unit in the location measurement subframe.

According to another aspect of the present invention, a UE comprises a receiver configured to receive at least one location measurement subframe for determination of the location of the UE from each of a plurality of base stations; and a processor configured to determine the location of the UE on the basis of a location measurement pilot allocated to the location measurement subframe received from each base station, wherein the location measurement pilot is allocated to part of repeating patterns of a channel estimation pilot in at least one resource unit in the location measurement subframe.

In the aspects of the present invention, at least one of subframes other than a subframe allocated a super frame header (SFH) may be set as the location measurement subframe.

In the aspects of the present invention, the at least one resource unit to which the location measurement pilot is allocated may be located in a region other than a control region carrying control information in the location measurement subframe.

In the aspects of the present invention, a location of a pattern to which a location measurement pilot of a neighbor cell is allocated in the location measurement subframe may be muted when a base station of the neighbor cell transmits the location measurement pilot of the neighbor cell.

In the aspects of the present invention, the location measurement pilot may be allocated to a resource unit allocated no control channel.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantages of Invention

According to the embodiments of the present invention, it is advantageous in that it is possible to transmit a location measurement signal for location based service while minimizing an effect on a structure of an existing radio frame.

Also, according to the embodiments of the present invention, it is advantageous in that it is possible to allocate a location measurement signal for location based service to a superframe while minimizing an effect on a reference signal and a control signal, which are allocated to an existing radio frame.

Also, according to the embodiments of the present invention, it is advantageous in that it is possible to reduce inter-cell interference of cells that take part in location measurement, thereby improving location measurement performance of the user equipment based on the location measurement signal.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

MODE FOR INVENTION

Figure 1:
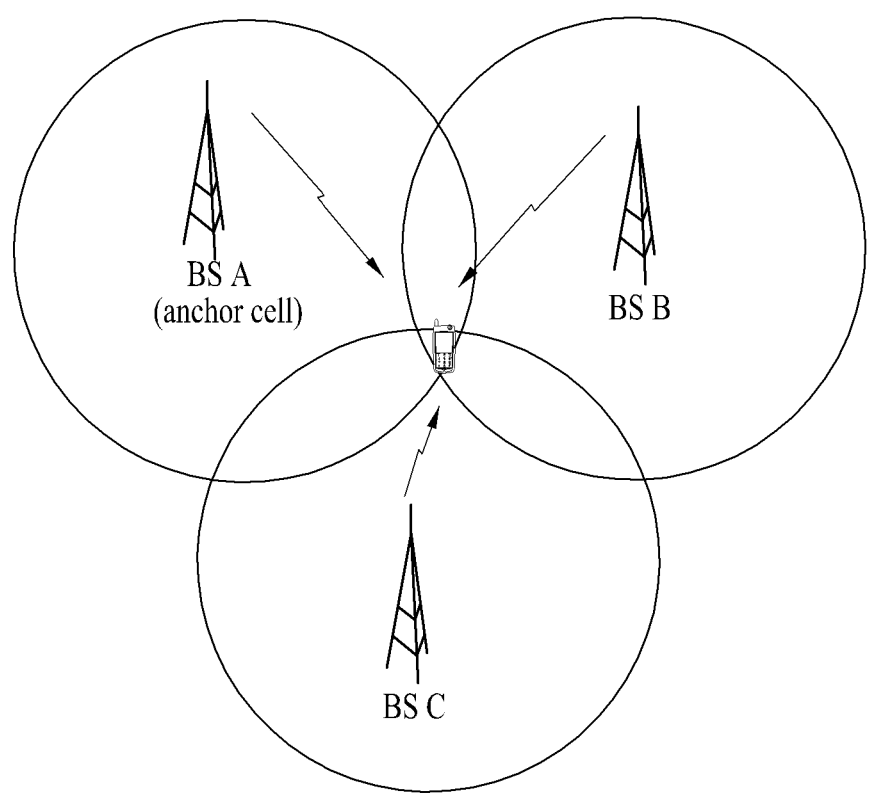
FIG. 1 is a conceptual view illustrating an OTDOA scheme for measuring a location of a user equipment.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a terminal equipment denotes a mobile or fixed type user terminal. Examples of the terminal equipment include various equipments that transmit and receive user data and/or various kinds of control information to and from a base station. The terminal equipment may be referred to as a user equipment (UE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

A wireless communication system to which the embodiments of the present invention are applied includes a plurality of base stations. Each base station provides a communication service to user equipment(s) located in a specific local zone (generally referred to as a cell). The cell can be divided into a plurality of local zones (referred to as sectors).

Hereinafter, LBS superframe/frame/subframe/symbol represents superframe/frame/subframe/symbol to which a reference signal for location based service (LBS) is allocated. In addition, a reference signal for LBS represents a signal allocated to a radio resource for location measurement for LBS. As described in FIG. 1, in order to measure a location of a user equipment, signal transmission/arrival timing from each base station to the user equipment can be used. Examples of signals used for timing measurement include downlink pilot and advanced preamble (A-preamble) in a downlink, and also include uplink pilot and ranging channel in an uplink. Descriptions will be given of a method for allocating a pilot for location measurement (hereinafter referred to as an LBS pilot) for performing more accurate location measurement while minimizing the influence on allocation/measurement of existing pilots and transmission of existing system information and control information, a base station (BS) performing the allocation method, a method for receiving the LBS pilot to perform location measurement and a user equipment (UE) performing the reception method. The existing pilot is used for measurement of a channel quality indicator such as Signal-to-Interference-plus-Noise Ratio (SINR) and frequency offset, channel estimation, etc. A channel estimation value based on the existing pilot is used for a UE or a BS to demodulate received data. Therefore, a description will be given of embodiments of the present invention in which the existing pilot is referred to as a channel estimation pilot or demodulation pilot.

Figure 2:
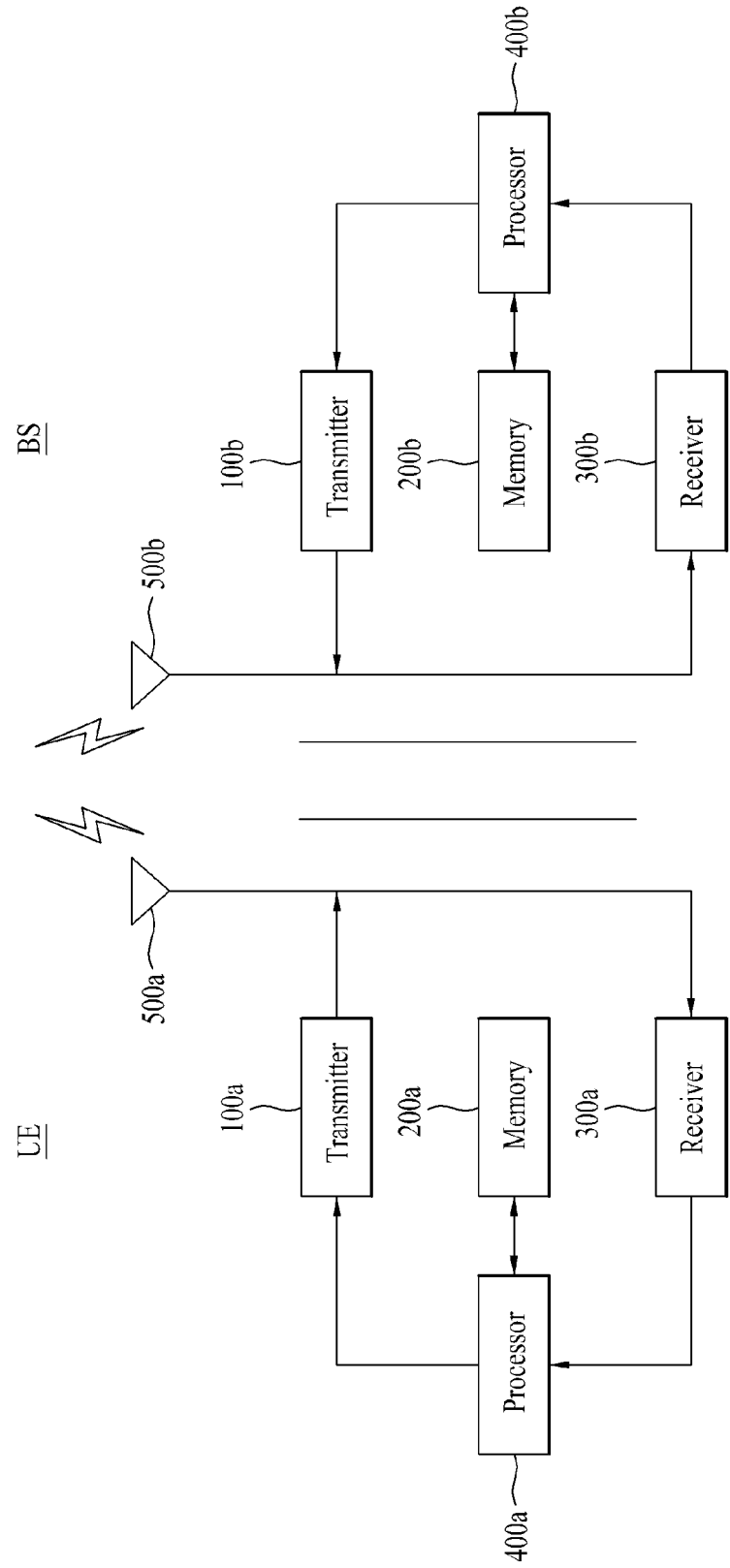
FIG. 2 is a block diagram illustrating a user equipment and a base station for implementing the present invention.

FIG. 2 is a block diagram illustrating a user equipment and a base station for implementing the present invention.

The user equipment serves as a transmitting apparatus on the uplink and as a receiving apparatus on the downlink. By contrast, the base station may serve as a receiving apparatus on the uplink and as a transmitting apparatus on the downlink.

The user equipment and the base station include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The user equipment and the base station further include processors 400a and 400b, respectively, which are adapted to perform the present invention by controlling the components of the user equipment and the base station, such as the transmitters 100a and 100b, the receivers 300a and 300b, and the memories 200a and 200b. The transmitter 100a, the memory 200a, the receiver 300a, and the processor 400a in the user equipment may be configured as independent components by separate chips or their separate chips may be incorporated into a single chip. Likewise, the transmitter 100b, the memory 200b, the receiver 300b, and the processor 400b in the base station may be configured as independent components on separate chips or their separate chips may be incorporated into a single chip. The transmitter and the receiver may be configured as a single transceiver in the user equipment or the base station.

The antennas 500a and 500b transmit signals generated from the transmitters 100a and 100b to the outside, or transfer radio signals received from the outside to the receivers 300a and 300b. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the user equipment and the base station. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b. The transmitters 100a and 100b and the receivers 300a and 300b of the user equipment and the base station may be configured in different manners depending on the procedures of processing transmitted signals and received signals.

Figure 3:
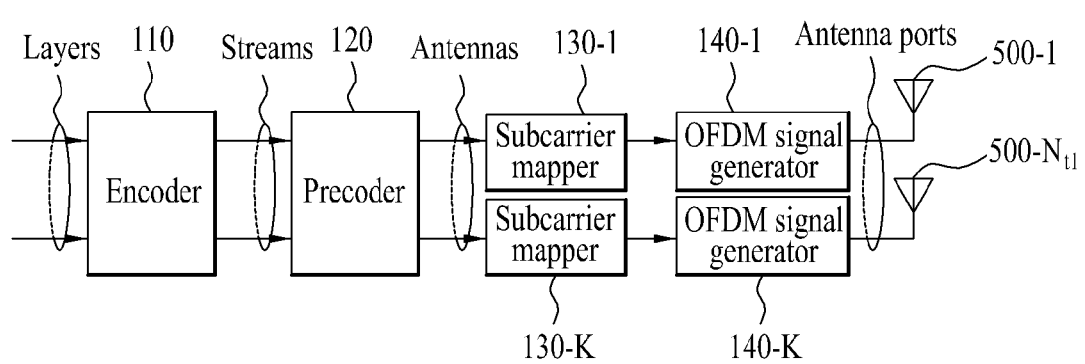
FIG. 3 is a block diagram illustrating an example of a transmitter in each of the user equipment and the base station.

FIG. 3 is a block diagram illustrating an example of a transmitter in each of the user equipment and the base station. Operations of the transmitters 100a and 100b will be described below in more detail with reference to FIG. 3.

Each of the transmitters 100a and 100b includes an encoder 110, a precoder 120, subcarrier mappers 130-1 to 130-K, Orthogonal Frequency Division Multiplexing (OFDM) signal generators 140-1 to 140-K. Each of the transmitter 100a and 100b is connected to $N_{t1}$ transmission antennas 500-1 to 500-$N_{t1}$.

The encoder 110 encodes a transmission data stream in accordance with a predetermined coding scheme to form coded data and modulates the coded data to be arranged as symbols representing positions on a signal constellation in a predetermined modulation scheme. The modulation scheme may be, but not limited to, any of m-Phase Shift Keying (m-PKS) and m-Quadrature Amplitude Modulation (m-QAM). For modulating the coded data, the encoder 110 may have an independent modulation module. In the mean time, the encoder 110 may define the layers of the input symbols such that the precoder 120 can distribute antenna-specific symbols to corresponding antenna paths. A layer refers to an information path input to the precoder 120, and the information path before the precoder 120 may be referred to as a virtual antenna or layer. To define the layers of the symbols, the encoder 110 may be provided with a layer mapper configured as an independent module.

The precoder 120 outputs antenna-specific symbols to the subcarrier mappers 130-1 to 130-K by processing the received symbols in accordance with to a MIMO scheme according to the multiple transmission antennas 500-1 to 500-$N_{t1}$. Mapping of the MIMO streams to the antennas 500-1 to 500-$N_t$ is performed by the precoder 120. Specifically, the precoder 120 multiplies the output x of the encoder 11 by an $N_t \times M_t$ precoding matrix W. The output of the precoder 120 may be represented as an $N_t \times N_F$ matrix z.

The subcarrier mappers 130-1 to 130-K allocate the antenna-specific symbols to appropriate subcarriers and multiplex them according to users. The OFDM signal generators 140-1 to 140-K output OFDM symbols by modulating the antenna-specific symbols according to OFDM modulation scheme. For example, the OFDM signal generators 140-1 to 140-K may perform Inverse Fast Fourier Transform (IFFT)

for the antenna-specific symbols and insert a Cyclic Prefix (CP) into the resulting IFFT time-domain symbol. The OFDM symbol is transmitted to the receiving apparatus through the transmission antennas 500-1 to 500-K.

The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module.

Although it has been described in FIG. 2 and FIG. 3 that each of the transmitters 110a and 100b includes the encoder 110, the precoder 120, the subcarrier mappers 130-1 to 130-K, and the OFDMA signal generators 140-1 to 140-K, the processors 400a and 400b of the transmitting apparatus may include the encoder 110, the precoder 120, the subcarrier mappers 130-1 to 130-K, and the OFDMA signal generators 140-1 to 140-K. Likewise, although it has been described in FIG. 2 and FIG. 3 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the encoder 110, the precoder 120, the subcarrier mappers 130-1 to 130-K, and the OFDMA signal generators 140-1 to 140-K are included in the transmitters 100a and 100b separated from the processors 400a and 400b that control the operations of the encoder 110, the precoder 120, the subcarrier mappers 130-1 to 130-K, and the OFDMA signal generators 140-1 to 140-K. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the encoder 110, the precoder 120, the subcarrier mappers 130-1 to 130-K, and the OFDMA signal generators 140-1 to 140-K are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

In the mean time, the processor 400b in the base station of the present invention sets subframes for LBS in accordance with the embodiments of the present invention, which will be described later, and controls the transmitter 100b to allocate a pilot for LBS to predetermined frequency/time resources within the subframe.

Also, the processor 400a in the user equipment of the present invention can be configured to measure the location of the user equipment within the cell of each base station that has transmitted the pilot for LBS, based on the pilot for LBS allocated to the predetermined frequency/time resources in accordance with the embodiments of the present invention. Also, the processor 400a in the user equipment can control the transmitter 400a of the user equipment by feeding the measured result back to the base station that has transmitted the pilot for LBS. The processor 400a or the receiver 300a of the user equipment can be configured to have a separate module that measures the location by using location measurement signals for LBS.

Figure 4:
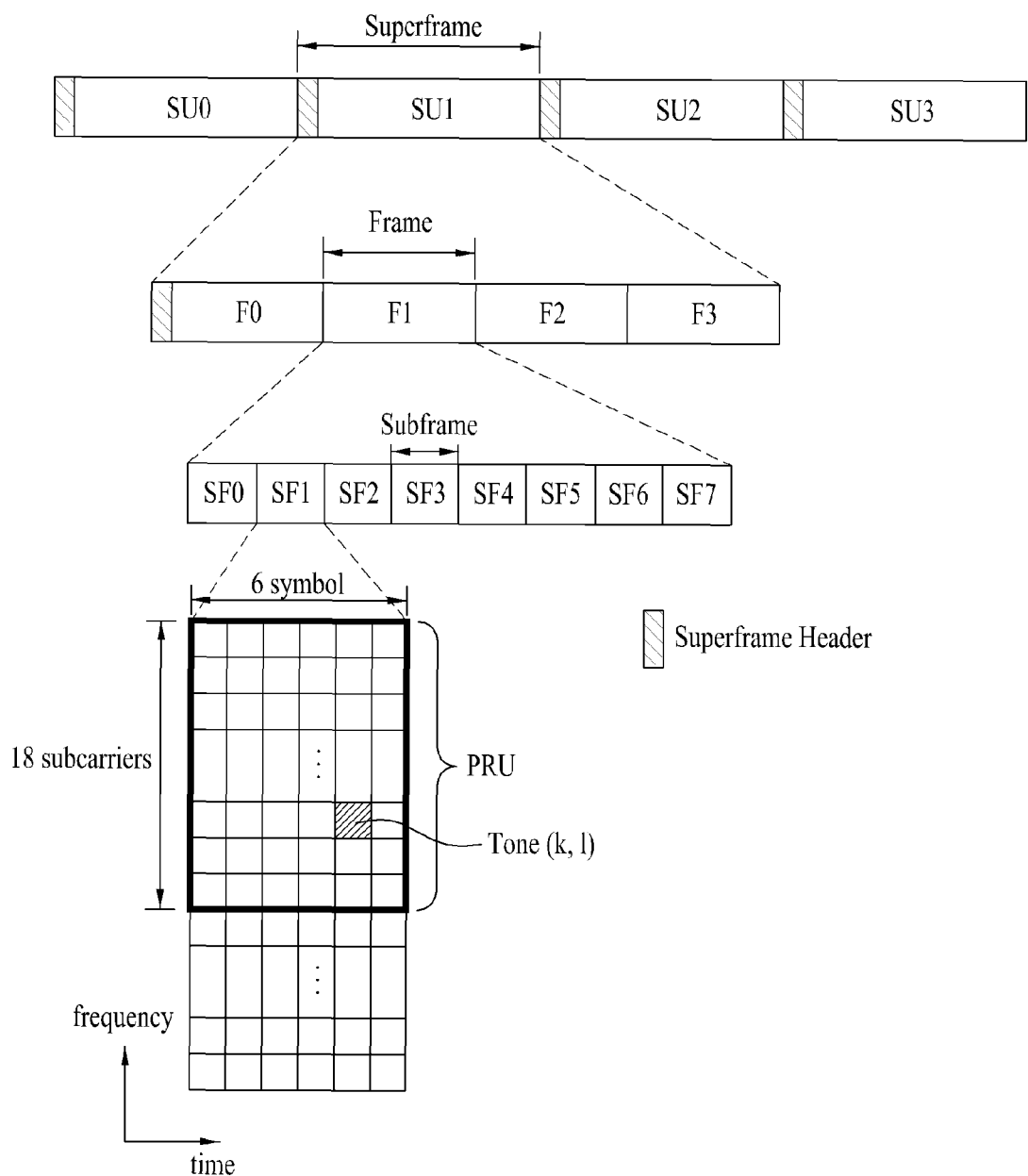
FIG. 4 is a diagram illustrating an example of a radio frame used in a wireless communication system.

FIG. 4 illustrates an example of a structure of a radio frame used in the wireless communication system. Especially, FIG. 4 illustrates a structure of a radio frame of the IEEE 802.16 system. The radio frame structure can be applied to a frequency division duplex (FDD) mode, a half frequency division duplex (H-FDD) mode, and a time division duplex (TDD) mode.

Referring to FIG. 4, the radio frame includes superframes SU0 to SU3 of 20 ms that support a bandwidths of 5 MHz, 8.75 MHz, 10 MHz or 20 MHz. Each superframe includes four frames F0 to F3 of 5 ms having the same size, and starts with a superframe header (SFH). The superframe header carries essential system parameter and system configuration information. The superframe header can be located within the first subframe of the superframe. The superframe header can be classified into a primary superframe header (P-SFH) and a secondary superframe header (S-SFH). The P-SFH is transmitted per superframe. The S-SFH may be transmitted per superframe. The superframe header can include a broadcast channel.

One frame can include eight subframes SF0 to SF7. The subframe is allocated for downlink or uplink transmission. The frame can be configured differently depending on duplex modes. For example, since downlink transmission and uplink transmission are differentiated by frequency in the FDD mode, one frame includes either downlink subframes or uplink subframes. In the FDD mode, an idle time can exist at the end of each frame. On the other hand, since downlink transmission and uplink transmission are differentiated by time in the TDD mode, subframes within the frame are classified into a downlink subframe and an uplink subframe. In the TDD mode, an idle time referred to as a transmit/receive transition gap (TTG) exists while the downlink is being changed to the uplink. Also, idle time referred to as a receive/transmit transition gap (RTG) exists while the uplink is being changed to the downlink.

The subframe is a unit of a transmission time interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and cyclic prefix (CP) length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes.

In the frequency domain, the OFDMA symbol includes a plurality of subcarriers, and the number of subcarriers is determined depending on the size of fast fourier transform (FFT). The subcarriers can be classified into data subcarriers for data transmission, pilot subcarriers for channel measurement, and null subcarriers for guard band and DC components. Examples of parameters for the OFDMA symbols include BW, $N_{used}$, n, G, etc. The BW is a nominal channel bandwidth. $N_{used}$ is the number of subcarriers used for signal transmission. Also, n is a sampling factor, and determines subcarrier spacing and useful symbol time together with BW and $N_{used}$. G is a ratio between CP time and useful time.

In the frequency domain, resources can be grouped in a predetermined number of subcarriers. A group comprised of a predetermined number of subcarriers within one subframe is referred to as a physical resource unit (PRU). The subframe includes a plurality of physical resource units (PRUs) in the frequency domain. The PRU is a basic unit for resource allocation, and includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDM symbols×18 subcarriers. The PRU can be denoted as a distributed resource unit (DRU) or a contiguous resource unit (CRU) depending on a resource allocation type. A basic permutation unit of a downlink DRU is a tone-pair that includes two subcarriers and one symbol. In case of the subframe type-1, one PRU includes 108 tones. A tone can be also referred to as a resource element.

The subframe can be divided into at least one frequency partition (FP) in a frequency domain. The frequency partition can be used for fractional frequency reuse (FFR). Each frequency partition includes one or more PRUs. Distributed resource allocation and/or contiguous resource allocation can be applied to each frequency partition. A logical resource unit (LRU) is a basic logical unit for distributed resource allocation and contiguous resource allocation. The mapping relationship among PRU, LRU and FP will be described in detail later with reference to FIG. 12.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

The present invention proposes an LBS subframe structure, a method for transmitting an LBS subframe, a method for allocating an LBS pilot, and a signaling method therefor to support effective LBS in an existing subframe structure.

Figure 5:
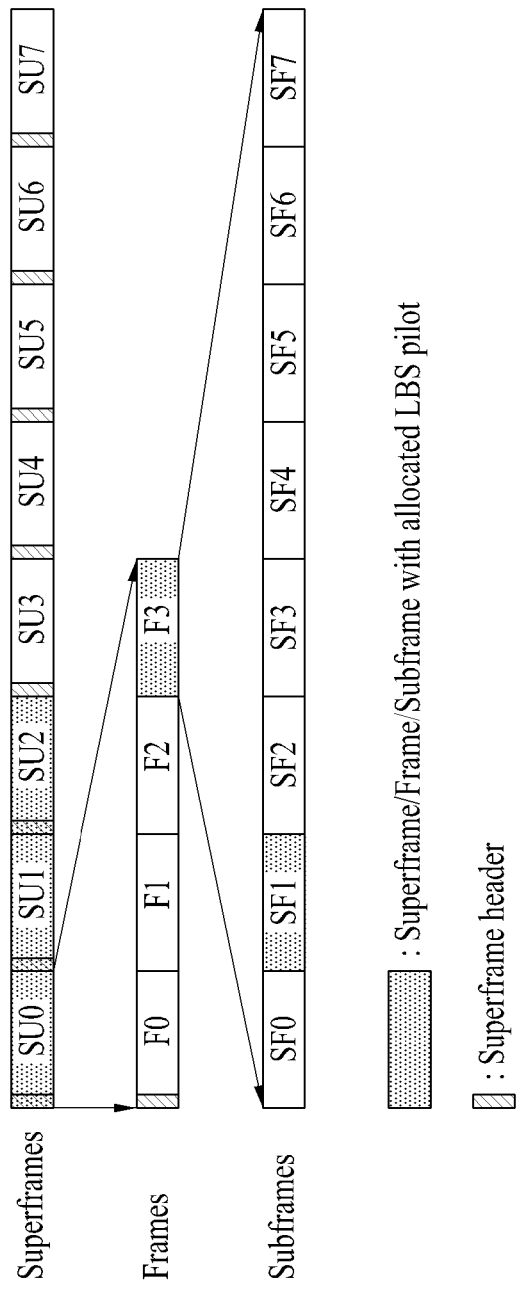
FIGS. 5, 6 and 7 illustrate embodiments of transmitting LBS subframes.
Figure 6:
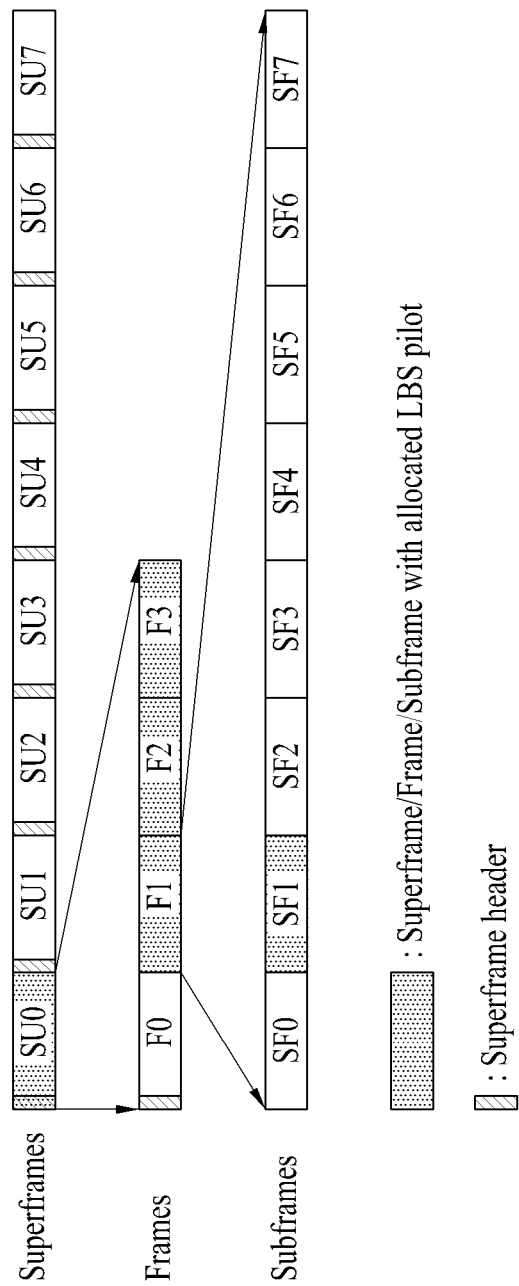
Figure 7:
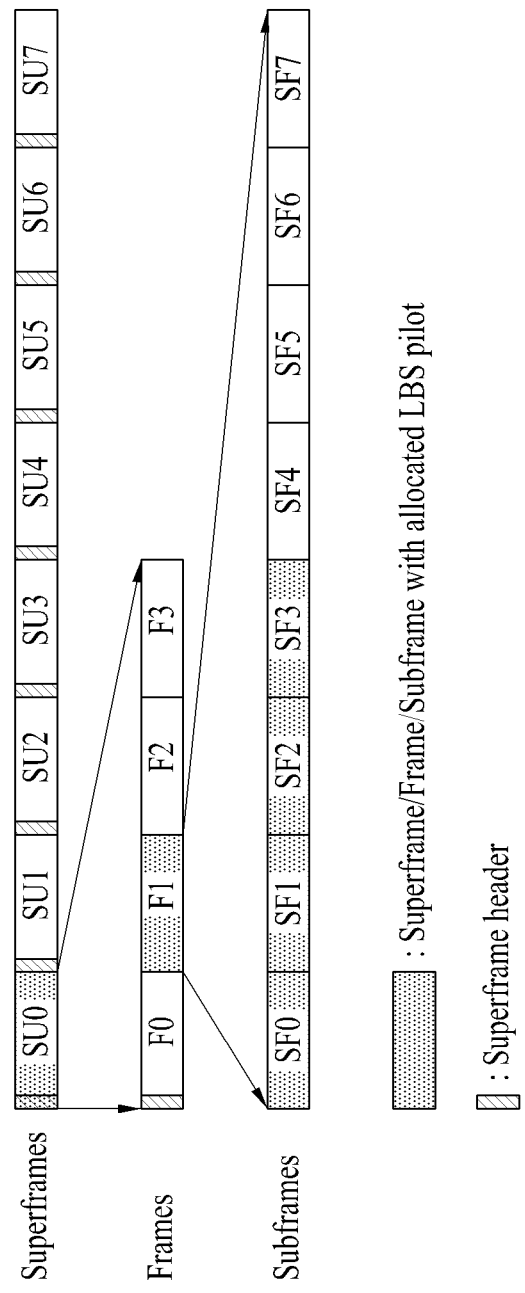

FIGS. 5, 6 and 7 illustrate embodiments of transmitting LBS subframes.

An LBS subframe represents a subframe to which an LBS pilot is allocated. A location and interval of the LBS subframe in a superframe/frame may be predefined and indicated by an SFH. Only the location of the LBS subframe is fixed and transmission thereof may be performed aperiodically. The SFH may include information on the transmission interval of the LBS subframe. Alternatively, the transmission interval of the LBS subframe may be fixed and only the location of the LBS subframe may be indicated by the SFH.

The SFH needs to be transmitted because it contains essential system configuration information. Accordingly, a subframe other than a subframe including an SFH (hereinafter, referred to as an SFH subframe) is used as the LBS subframe. The location of the LBS subframe may be defined in the relationship with the SFH subframe. For example, the location of the LBS subframe can be fixed to a predetermined offset (e.g., $offset_{number\ of\ subframe}$) from the SFH subframe. That is, the location of the LBS subframe can be defined by Expression 1.

$$\text{LBS subframe} = \text{SFH subframe} + offset_{number\ of\ subframe} \quad [\text{Math Figure 1}]$$

Reference signals are desirably measured for a predetermined time in a cumulative manner. FIGS. 5, 6 and 7 show embodiments of transmitting a plurality of LBS subframes such that LBS reference signals can be allocated and measured cumulatively or according to transmission scheduling between BSs.

Referring to FIG. 5, LBS subframes may be allocated to a plurality of consecutive superframes and transmitted. A BS can allocate an LBS subframe (e.g., subframe SF1) to one frame (e.g., frame F3) of each of superframes (e.g., superframes SU0, SU1 and SU2) and transmit the allocated LBS subframe to a UE located in the coverage thereof when LBS needs to be supported, or periodically. The UE can measure transmission/arrival timing of LBS pilots from the BS by accumulating LBS pilots allocated to LBS subframes in frame F3 of each of the superframes SU0, SU1 and SU2.

Referring to FIG. 6, LBS subframes may be allocated to a plurality of frames in one superframe and transmitted. The BS can allocate an LBS subframe (e.g., subframe SF1) to each of a plurality of frames (e.g., frames F1, F2 and F3) in one superframe (e.g., superframe SU0) and transmit the allocated LBS subframe to the UE located in the coverage thereof when LBS needs to be supported, or periodically. The UE can measure transmission/arrival timing of LBS pilots from the BS by accumulating LBS pilots allocated to LBS subframes in frames F1, F2 and F3 of superframe SU0.

Referring to FIG. 7, a plurality of LBS subframes may be allocated to one frame in one superframe and transmitted. The BS can allocate a plurality of LBS subframes (e.g., subframes SF0, SF1, SF2 and SF3) to one frame (e.g., frame F1) in one superframe (e.g., superframe SU0) and transmit the allocated LBS subframes to the UE located in the coverage thereof when LBS needs to be supported, or periodically. The UE can measure transmission/arrival timing of LBS pilots from the BS by accumulating LBS pilots allocated to LBS subframes SF0, SF1, SF2 and SF3 in frame F1 of superframe SU0.

In FIGS. 5, 6 and 7, cases in which LBS subframes are transmitted in fixed locations have been described. However, the locations of the LBS subframes may not be fixed, as described above. LBS subframes may be transmitted periodically, when LBS needs to be supported (e.g., a UE moves between BSs), or aperiodically at the request of a BS/UE. When transmit locations of LBS subframes are not fixed or LBS subframes are transmitted aperiodically, an SFH can be configured such that it includes information indicating the transmit locations of the LBS subframes and/or transmission timing of the LBS subframes.

The number of LBS subframes accumulated and used or allocated and used according to transmission scheduling between BSs may be predefined. In addition, the number of LBS subframes accumulated or allocated according to transmission scheduling between BSs can be changed depending on system environment, for example, presence or absence of regular or irregular subframes based on a radio frame, the number of regular or irregular subframes, a system bandwidth, CP type, etc. When the number of LBS subframes can be changed, the BS can broadcast information on LBS subframes accumulated or allocated according to transmission scheduling among BSs, for example, information on the (maximum) number of accumulated LBS subframes through an SFH or MAC management message.

Each of the embodiments of transmitting LBS subframes, shown in FIGS. 5, 6 and 7, can be combined with each of embodiments A, B, C and D, and embodiments II and III relating to a region to which LBS pilots are allocated in LBS subframes, embodiments 1, 2, 3 and 4 of allocating LBS pilot patterns in one resource unit, which will be described later.

Figure 8:
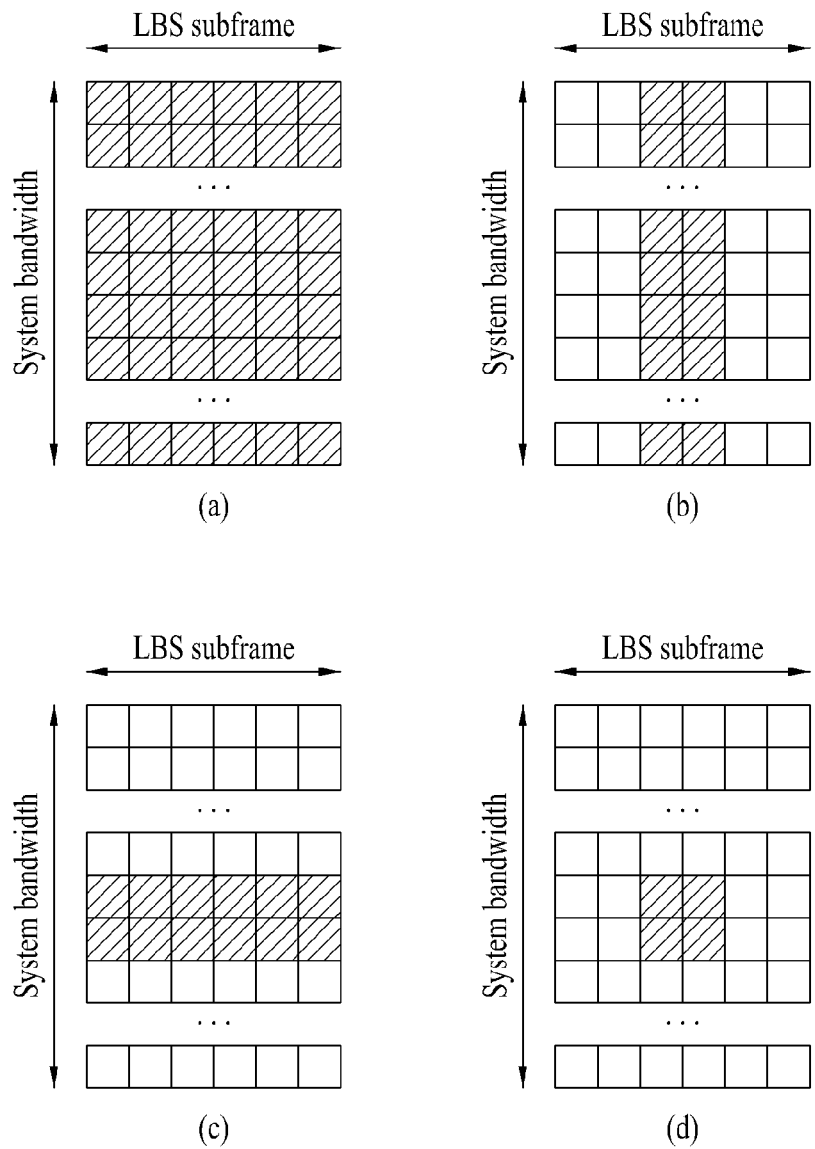
FIG. 8 roughly illustrates embodiments of regions to which LBS pilots are allocated in an LBS subframe.

FIG. 8 roughly illustrates embodiments relating to a region to which LBS pilots are allocated in LBS subframes.

A specific pilot pattern for LBS needs to be allocated to an LBS subframe for signal measurement for LBS. In this case, allocation of the LBS pilot pattern is restricted according to the form of the LBS pilot pattern based on power distribution with existing pilots for data demodulation and the number of reuse patterns. Further, when existing pilots have already been allocated to all OFDMA symbols of a corresponding subframe, for example, in the case of a 2-stream pilot pattern (refer to FIG. 13) in an IEEE 802.16m system, it is difficult to allocate LBS pilot patterns. To solve these problems, when existing pilots are allocated to all OFDMA symbols of a subframe corresponding to an LBS subframe, the present invention proposes a method of dropping transmission of existing pilots in the whole or part of resource units of the subframe, allocating LBS pilots to the resource units from which transmission of the existing pilots is dropped and transmitting the LBS pilots to a UE. When there is a symbol without an allocated existing pilot among OFDMA symbols of an LBS subframe, for example, in the case of a 4-stream pilot pattern (refer to FIG. 14) or 8-stream pilot pattern (refer to FIG. 15) in an IEEE 802.16m system, an LBS pilot pattern can be allocated to the symbol without an allocated existing pilot. In the following description, when a specific signal is not transmitted in a transmit location of the specific signal in resource units, it is represented that dropping, muting, nulling or blanking of transmission of the specific signal occurs.

Embodiments relating to a region in which an LBS pilot is allocated to an LBS subframe can be classified into four.

<Allocation of Pilots in LBS Subframe: Embodiment A>

Referring to FIG. 8(A), it is possible to mute the whole or part of an existing pilot pattern for the whole of a subframe corresponding to an LBS subframe and allocate LBS pilots to the location of the muted existing pilot pattern. LBS pilots are preferably allocated to a plurality of OFDMA symbols for measurement accuracy. Accordingly, embodiment A can improve measurement accuracy in one LBS subframe by allocating LBS pilots for the whole of an LBS subframe.

<Allocation of Pilots in LBS Subframe: Embodiment B>

Referring to FIG. 8(B), it is possible to mute the whole or part of a existing pilot pattern allocated to part of the time interval of a subframe corresponding to an LBS subframe, that is, part of OFDMA symbols, and allocate LBS pilots to the location of the muted portion of the existing pilot pattern. That is, embodiment B uses part of an LBS subframe for LBS pilot allocation in terms of the time domain.

<Allocation of Pilots in LBS Subframe: Embodiment C>

Referring to FIG. 8(C), it is possible to mute the whole or part of a existing pilot pattern allocated to all OFDMA symbols corresponding to part of frequency band (part of resource units) of a subframe corresponding to an LBS subframe and allocate LBS pilots to the location of the muted part of the existing pilot pattern. Embodiment C uses part of an LBS subframe for LBS pilot allocation in terms of the frequency domain.

<Allocation of Pilots in LBS Subframe: Embodiment D>

Referring to FIG. 8(D), it is possible to mute the whole or part of a existing pilot pattern allocated to part of OFDMA symbols corresponding to part of the frequency band (part of resource units) of a subframe corresponding to an LBS subframe and allocate LBS pilots to the location of the muted part of the existing pilot pattern. Embodiment D is a combination of embodiments B and C and uses part of an LBS subframe for LBS pilot allocation in terms of the time domain and frequency domain.

Embodiments B, C and D are more disadvantageous than embodiment A since they allocate the LBS pilots only to some of resource units in the LBS subframe. However, embodiment A has a disadvantage that performance deterioration may occur when data subcarriers of a corresponding cell are demodulated because a pilot for demodulation is not transmitted in the LBS subframe. On the other hand, embodiments B, C and D have an advantage of reduction of problems that may be generated when channel estimation pilots are not transmitted since the channel estimation pilots are allocated to the LBS subframe with the LBS pilots. Which one of embodiments A to D is used to allocate LBS pilots to an LBS subframe may depend on system conditions.

In embodiment A or B, the entire frequency band corresponding to the whole or part of symbols in an LBS subframe can be used for LBS pilot allocation. When LBS pilots are allocated over the entire frequency band as in embodiment A or B, the LBS pilots may collide with an allocation location of a legacy (i.e., existing) control channel. A description will be given of a problem generated when LBS pilots are allocated to a previous control channel region with reference to FIG. 9.

Figure 9:
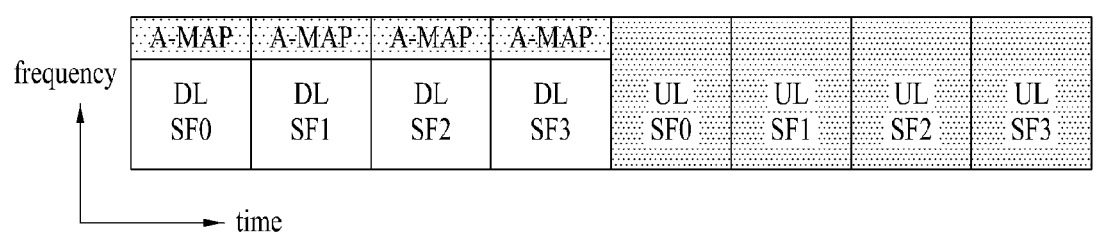
FIG. 9 illustrates an example of allocation of A-MAPs in a radio frame.

FIG. 9 illustrates an example of allocation of A-MAPs in a radio frame. Particularly, FIG. 9 shows a location of an A-MAP region in a TDD system having a downlink/uplink ratio of 4:4.

A-MAP (Advanced MAP) is a kind of control channel and carries service control information. The service control information includes user-specific control information and non-user-specific control information. The user-specific control information can be classified into allocation information, HARQ feedback information and power control information which are respectively transmitted assignment A-MAP, HARQ feedback A-MAP, and power control A-MAP. The non-user-specific A-MAP includes information which is not limited to only a specific user or users of a specific group. The assignment A-MAP includes resource allocation information on one UE or UE or one group. The HARQ feedback A-MAP carries HARQ ACK/NACK information regarding uplink data transmission and the power control A-MAP delivers a rapid power control command to a UE.

All the above-mentioned A-MAPs share a physical resource region called an A-MAP region. When a standard TTI is used, downlink data corresponding to A-MAP regions can occupy resource elements in arbitrary frequency partitions in downlink subframes in which the A-MAPs are located. Uplink data corresponding to A-MAP regions can occupy resource elements in arbitrary frequency partitions in uplink subframes according to relevance of A-MAPs and HARQ timing.

Fundamentally, A-MAP regions exist in all downlink subframes. When a downlink subframe is used as an LBS subframe, the LBS subframe includes an A-MAP region. In this case, in a structure in which an A-MAP is multiplexed with data through a frequency division multiplexing (FDM) scheme in the entire frequency band of the LBS subframe, allocation of the A-MAP and allocation of LBS pilot may collide each other. When an LBS pilot is allocated to an A-MAP region, service control information transmitted through the A-MAP is not delivered to a UE, and thus error may be generated when the UE transmits, receives and demodulates data. Further, the LBS pilot can interfere with a transmitted signal of a neighbor BS which transmits an A-MAP.

Therefore, the present invention proposes allocation of location measurement pilot for LBS to part of a frequency band except a resource region corresponding to a previous control channel region. For example, when X resource units are allocated for A-MAP for transmitting control information, LBS pilots are allocated to the whole or part of a total of X resource units included in an LBS subframe. In this case, if the LBS pilots are allocated in a distributed manner mixed with other distributed LRUs (DRUs) in a frequency partition, a power distribution problem associated with previous pilots and a design restriction problem are generated. Embodiments I, II and III of the present invention to solve these problems caused by the relationship among the LBS pilot, control channel and previous pilots in a frequency partition are described with reference to FIGS. 10, 11 and 12. Embodiment I of the present invention relates to a method for setting a region for LBS pilot pattern allocation in a logical domain, and embodiments II and III of the present invention relate to a method for setting a region for LBS pilot pattern in a physical domain.

Figure 10:
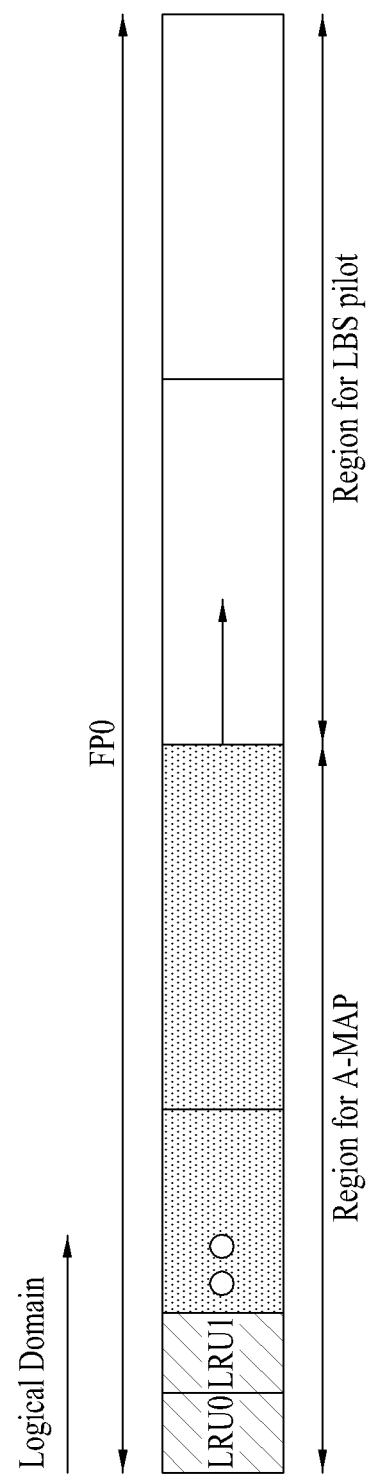
FIGS. 10 and 11 illustrate embodiment I of the present invention to allocate LBS pilots.
Figure 11:
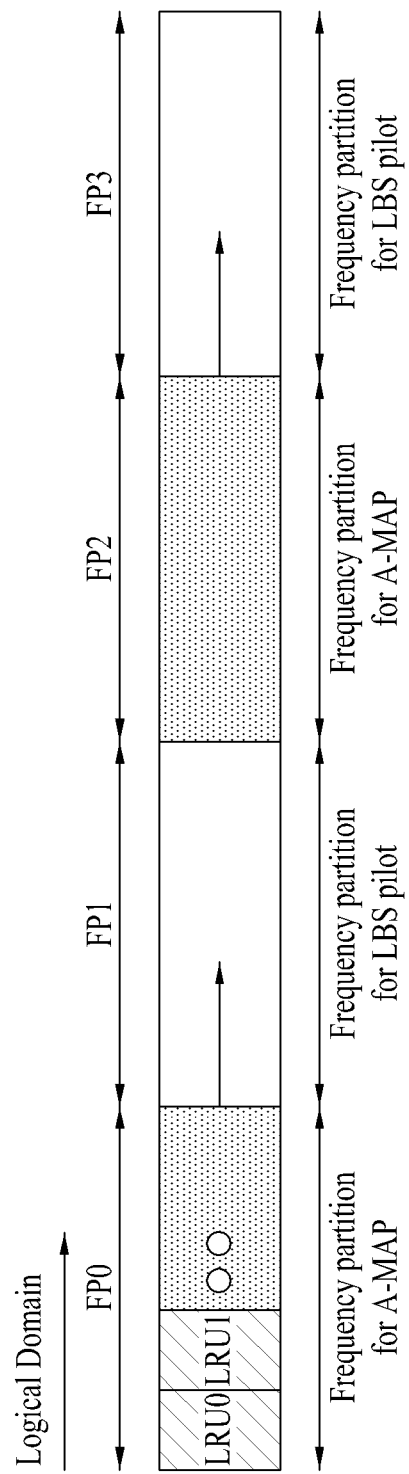

FIGS. 10 and 11 illustrate embodiment I of the present invention to allocate LBS pilots.

A frequency partition may include a plurality of LRUs which can be sequentially numbered in the logical domain. Part of the plurality of LRUs is used for A-MAP transmission. Embodiment I of the present invention allocates LBS pilots to the whole or part of LRUs in an LBS subframe except LRUs to which A-MAPs are allocated.

Referring to FIG. 10, LRUs other than LRUs with allocated A-MAPs in one frequency partition FP0 can be used for LBS pilot transmission.

LBS pilots are allocated to all or some LRUs other than LRUs occupied by A-MAPs in one frequency partition. If the frequency partition FP0 includes 24 LRUs LRU0 to LRU23 and A-MAPs are allocated to LRUs LRU0 to LRU7, LBS pilots can be allocated to the whole or some of the remaining LRUs LRU8 to LRU23.

The LRUs occupied by the A-MAPs can be varied according to system configuration and scheduler operation. The LRUs occupied by the A-MAPs can be indicated to a UE through an SFH or MAC management message.

Referring to FIG. 11, in the case of a multi-frequency partition scenario (e.g., reuse-2 scenario, reuse-3 scenario, etc.), all or some LRUs which belong to frequency partitions other than frequency partitions to which A-MAPs are allocated can be used for LBS pilot allocation.

For instance, if FFR (Fractional Frequency Reuse) is used in an LBS subframe, the LBS subframe can include reuse-1 partition and power-boosted reuse-3 partition. In an LBS subframe, non-user-specific A-MAP, HARQ feedback A-MAP, power control A-MAP are located in a frequency partition called a primary frequency partition which may be one of reuse-1 partition and power-boosted reuse-3 partition. Assignment A-MAP can be located in one or both of the reuse-1 partition and power-boosted reuse-3 partition. In this case, LBS pilots can be allocated to all or some LRUs belonging to frequency partitions other than the reuse-1 partition or power boosted reuse-3 partition.

Figure 12:
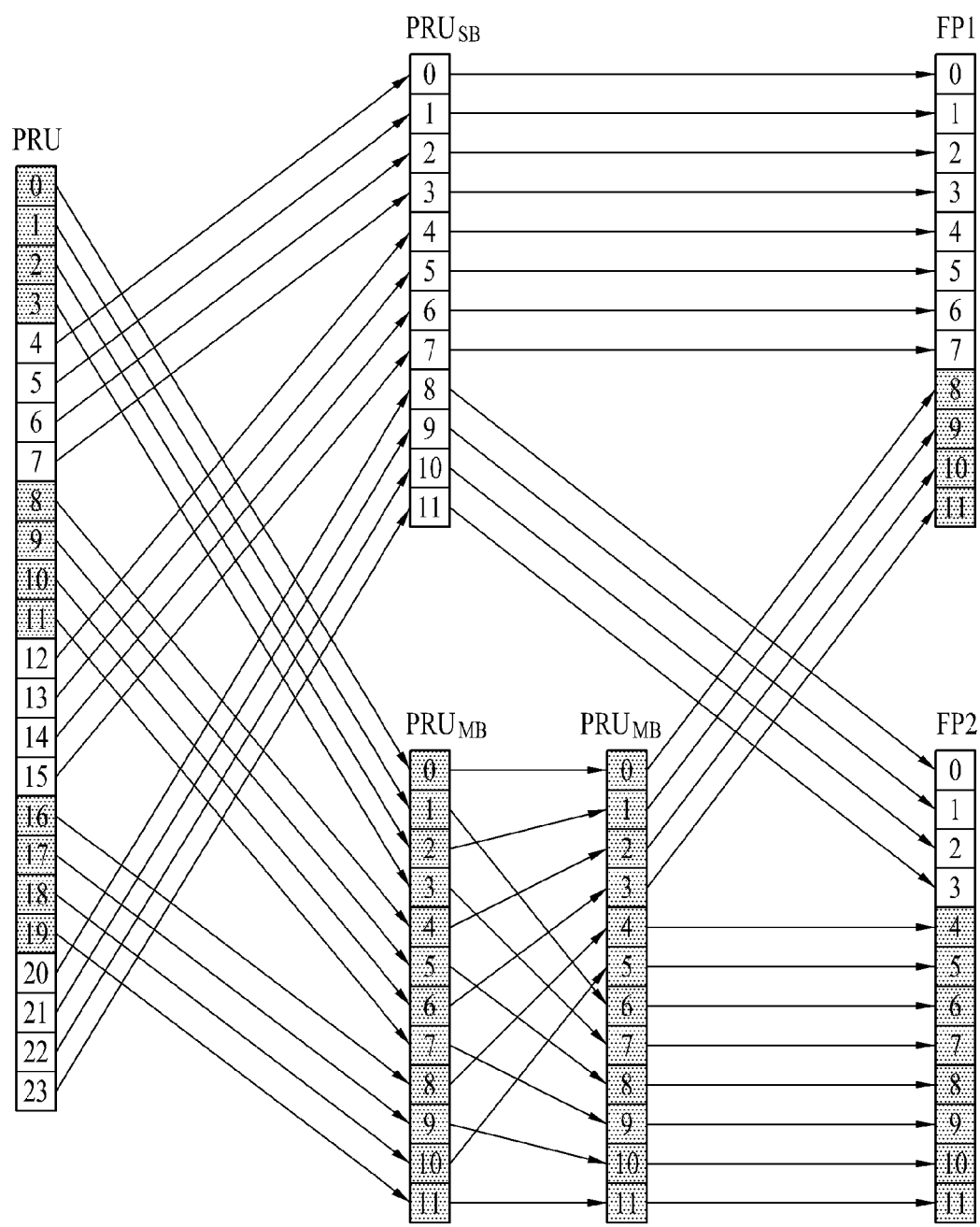
FIG. 12 illustrates embodiment II and embodiment III of the present invention to allocate LBS.

FIG. 12 illustrates embodiments II and III of the present invention to allocate LBS pilots and shows an exemplary method for mapping PRUs to frequency partitions.

Referring to FIG. 12, a subframe can include 23 PRUs in the frequency domain. This is an exemplary and the number of PRUs that can be included in a subframe depends on a system bandwidth, a frequency reuse scenario, the number of subcarriers included in a PRU, etc. Referring to FIG. 12, the 24 PRUs of the subframe are divided into two frequency partitions FP1 and FP2. PRUs are divided into subbands and minibands according to a predetermined resource mapping method. The subband means a unit of consecutive PRUs in the frequency domain or a minimum unit forming a CRU. The size of the frequency domain of each subband may correspond to 4 PRUs. The miniband means a unit of distributed PRUs or a unit forming a DRU. The size of the frequency domain of each miniband may correspond to 1 PRU or multiple PRUs. 4 PRUs corresponding to the subband size can be selected as a unit and allocated to the subband and miniband. A PRU belonging to the subband (i.e. subband PRU) is referred to as PRUSB and a PRU belonging to the miniband (i.e. miniband PRU) is referred to as PRUMB. The number of PRUs equals to the sum of the number of PRUSBs and the number of PRUMBs. PRUSBs are numbered from 0 to (the number of PRUSBs−1) and the PRUMBs are numbered from 0 to (the number of PRUMBs−1). The PRUMBs are miniband-permutated to be permuted in the frequency domain such that frequency diversity can be secured in each frequency partition. That is, numbered PRUMBs are permuted according to a predefined permutation (or mapping) rule to become permuted PRUMBs (PPRUMBs). Part of the PRUSBs and part of the PRUMBs are mapped to the first frequency partition FP1. The remaining PRUSBs other than the PRUSBs mapped to the first frequency partition FP1 and the remaining PRUMBs other than the PRUMBs mapped to the first frequency partition FP1 are mapped to the second frequency partition FP2. Each frequency partition is divided into CRUs and DRUs according to resource units. Sector specific permutation can be supported and direct resource mapping can be supported for consecutive resources. The size of distributed/consecutive resources can be flexibly set for each sector. Consecutive groups and distributed groups are mapped to LRUs. PRUs are directly mapped to consecutive resource units in each frequency partition. PRUs and LRUs have the same structure.

Embodiment II of the present invention allocates LBS pilots to PRUs belonging to subbands in order to assign the LBS pilots in the physical domain. Referring to FIG. 12, the subband corresponding to PRUs PRU4 to PRU7, the subband corresponding to PRUs PRU12 to PRU15, and the subband corresponding to PRUs PRU20 to PRU23 can be used for LBS pilot allocation. A control channel has disadvantages of difficult power control and difficult MCS (Modulation Coding Scheme) adjustment. Accordingly, A-MAP is not allocated to a subband in which 4 PRUs are treated as a set in order to gain diversity gain, in general. Therefore, A-MAP can be stably transmitted in an LBS subframe by allocating LBS pilots to a subband.

Information indicating which subband in an LBS subframe is used for LBS pilot allocation can be broadcast to UEs through an SFH or MAC management message.

Embodiment III of the present invention allocates LBS pilots to PRUs belonging to a frequency partition other than a frequency partition to which A-MAPs are allocated in order to assign LBS pilots in the physical domain. In a system to which a multi-frequency partition scenario is applied, it is possible to allocate A-MAPs to some of a plurality of frequency partitions. In this case, a frequency partition including no A-MAP does not affect transmission of A-MAP even if LBS pilots are allocated to PRU(s) belonging to a miniband as well as PRUs belonging to a subband.

Embodiments relating to determination of a resource unit assigned to an LBS pilot among a plurality of resource units in one LBS subframe, that is, embodiments relating to a method for setting an LBS pilot region with allocated LBS pilots in the LBS subframe are described with reference to FIGS. 8 to 12. How to allocate LBS pilots to one resource unit in the LBS pilot region has become a problem. A description will be given of embodiments of allocating an LBS pilot to one resource unit in an LBS subframe with reference to FIGS. 13 to 24.

A pattern of a common pilot, a cell-specific pilot or a UE-specific pilot for data demodulation is repeated on the basis of resource units. The present invention proposes embodiments for muting all or part of an existing pilot pattern repeating in an LBS subframe and allocating an LBS pilot pattern to resource unit(s) to which the muted pilot pattern belongs. In this case, the same LBS pilot pattern can be repeated on the basis of resource units in the resource region with allocated LBS pilots as in the existing pilot pattern. For example, an LBS pilot pattern can be repeated in the entire LBS subframe on the basis of resource units according to embodiment A, an LBS pilot pattern can be repeated in predetermined OFDMA symbols according to embodiment B, an LBS pilot pattern can be repeated in a predetermined frequency interval according to embodiment C, an LBS pilot pattern can be repeated in predetermined OFDMA symbols and a predetermined frequency interval according to embodiment D.

Figure 13:
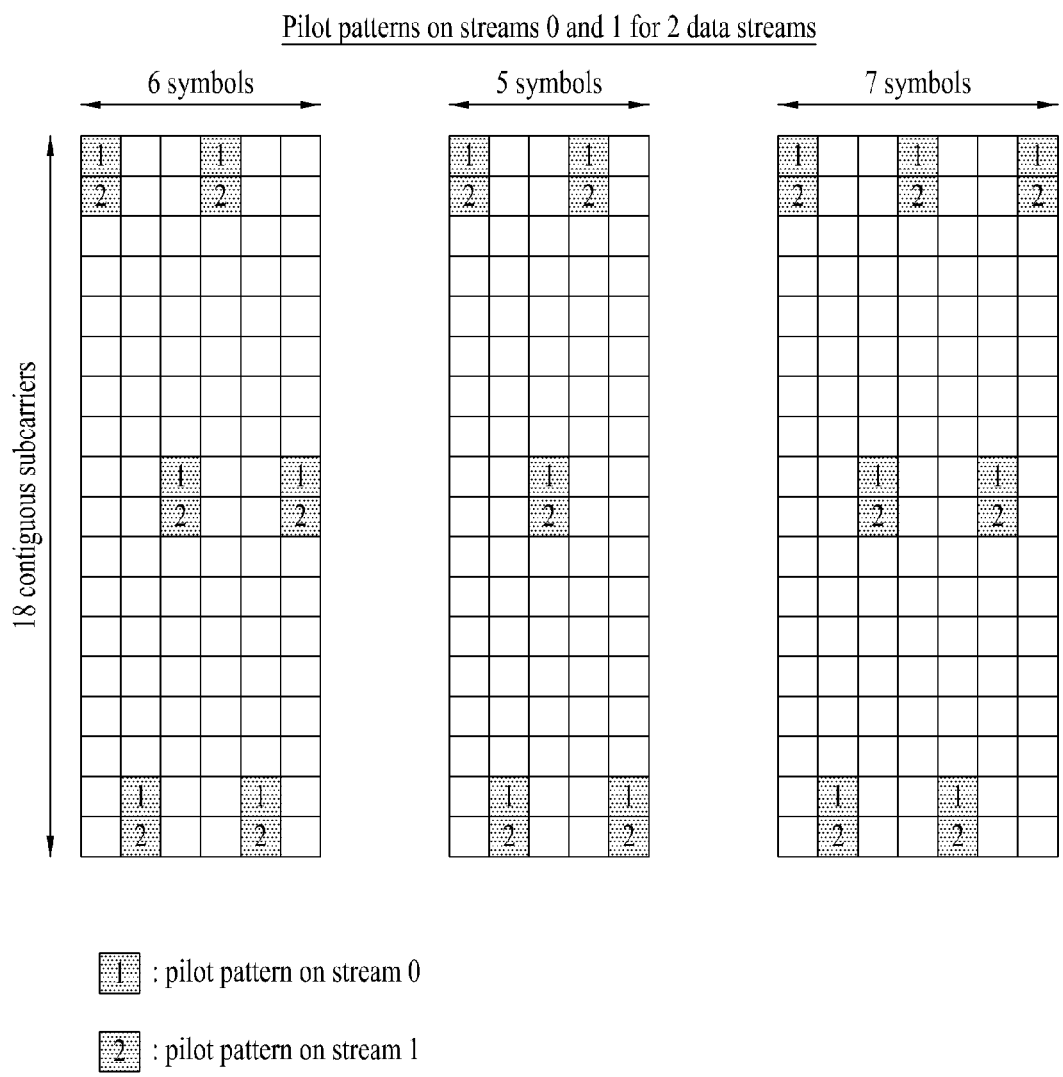
FIGS. 13, 14 and 15 illustrate examples of conventional pilot patterns allocated to one resource unit.
Figure 14:
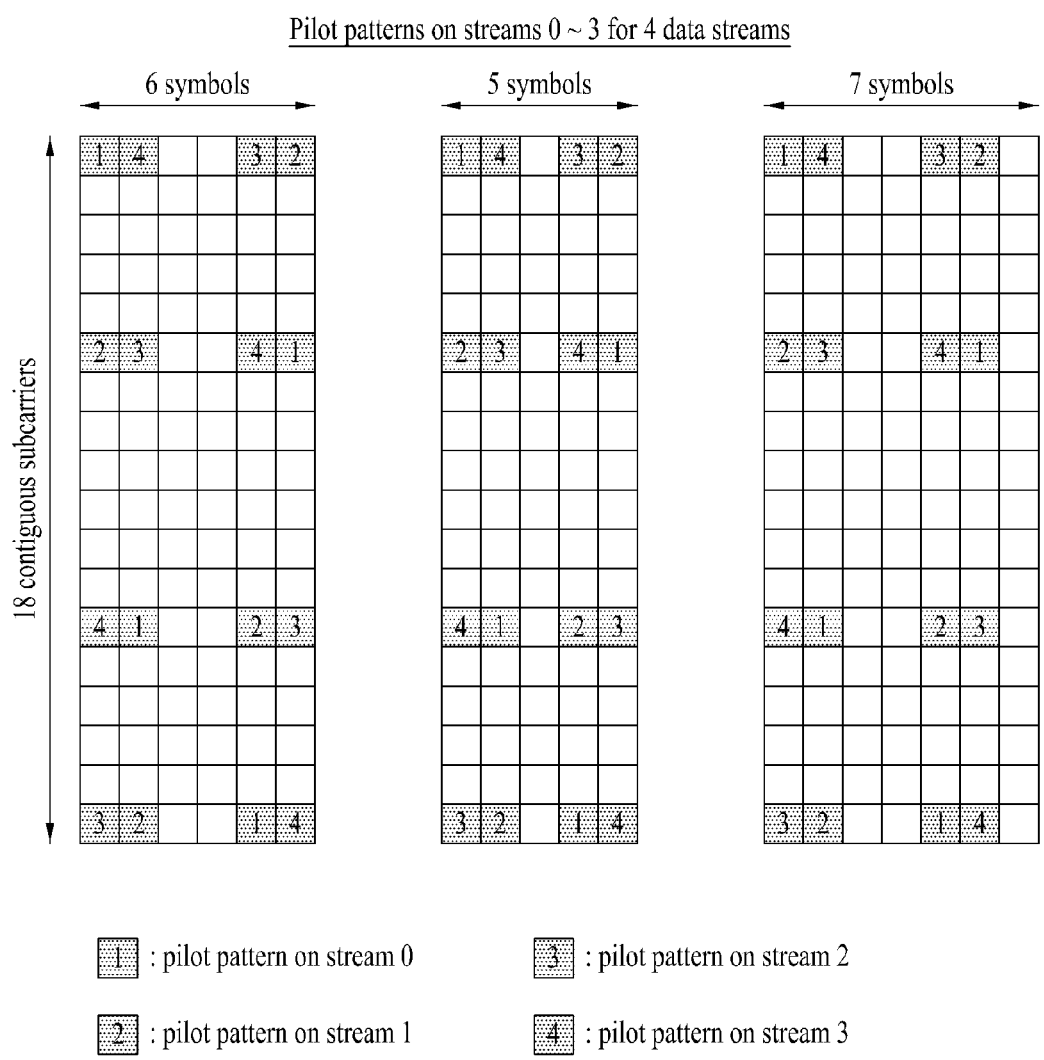
Figure 15:
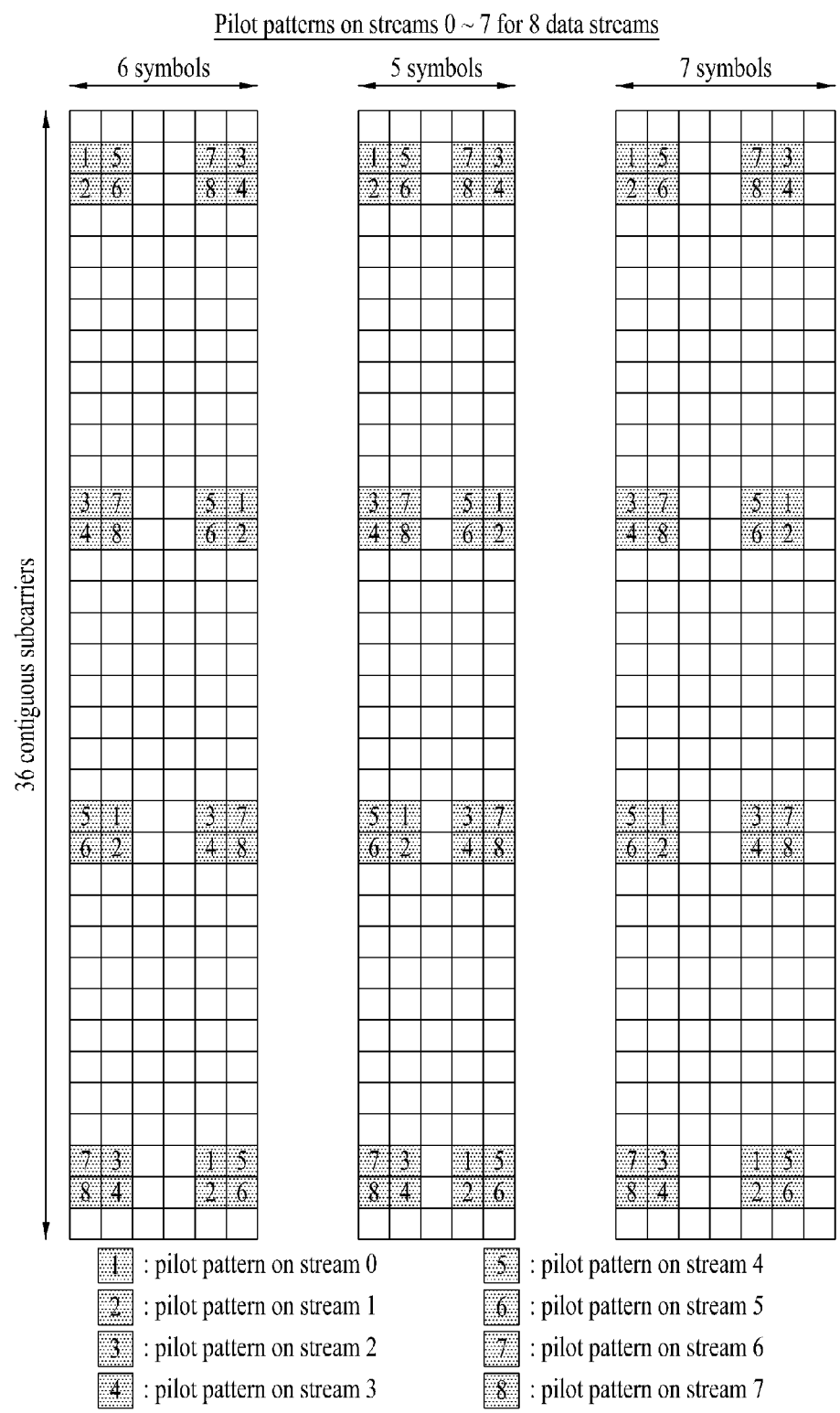

FIGS. 13, 14 and 15 illustrate examples of existing pilot patterns allocated to one resource unit.

FIG. 13 illustrates base pilot patterns used for 2 data streams in a dedicated and common pilot scenario. FIG. 13 shows pilot location of pilot stream 1 (pilot pattern on stream 0) and pilot location of pilot stream 2 (pilot pattern on stream 1) in PRUs of 6 OFDMA symbols, 5 OFDMA symbols and 7 OFDMA symbols.

For reference, a base pilot pattern for 1 data stream (not shown) corresponds to the pilot pattern of pilot stream 1 of FIG. 13. In the case of 1 data stream, a pilot tone of pilot stream 2 for 2 data streams can be used for transmission of data instead of pilot.

FIG. 14 illustrates base pilot patterns used for 4 data streams in the dedicated and common pilot scenario. FIG. 14 shows pilot location of pilot stream 1 (pilot steam on stream 0), pilot location of pilot stream 2 (pilot pattern on stream 1), pilot location of pilot stream 3 (pilot pattern on stream 2), and pilot location of pilot stream 4 (pilot pattern on stream 3) in PRUs of 6 OFDMA symbols, 5 OFDMA symbols and 7 OFDMA symbols.

FIG. 15 illustrates base pilot patterns used for 8 data streams in the dedicated and common pilot scenario. FIG. 15 shows pilot location of pilot stream 1 (pilot pattern on stream 0), pilot location of pilot stream 2 (pilot pattern on stream 1), pilot location of pilot stream 3 (pilot pattern on stream 2), pilot location of pilot stream 4 (pilot pattern on stream 3), pilot location of pilot stream 5 (pilot pattern on stream 5), pilot location of pilot stream 6 (pilot pattern on stream 6), pilot location of pilot stream 7 (pilot pattern on stream 7), and pilot location of pilot stream 8 (pilot pattern on stream 8) in PRUs of 6 OFDMA symbols, 5 OFDMA symbols and 7 OFDMA symbols.

Referring to FIGS. 13, 14 and 15, it can be known that the pilot pattern of one stream is repeated for every combination of a predetermined number of OFDMA symbols or a predetermined number of subcarriers in one PRU. First and second embodiments of the present invention to allocate LBS pilots instead of existing pilots to the locations of one pilot pattern and/or a multiple of the pilot pattern in repeated OFDMA symbols or subcarriers using the existing pilot pattern repetition characteristics will now be explained with reference to FIGS. 16 to 20.

Figure 16:
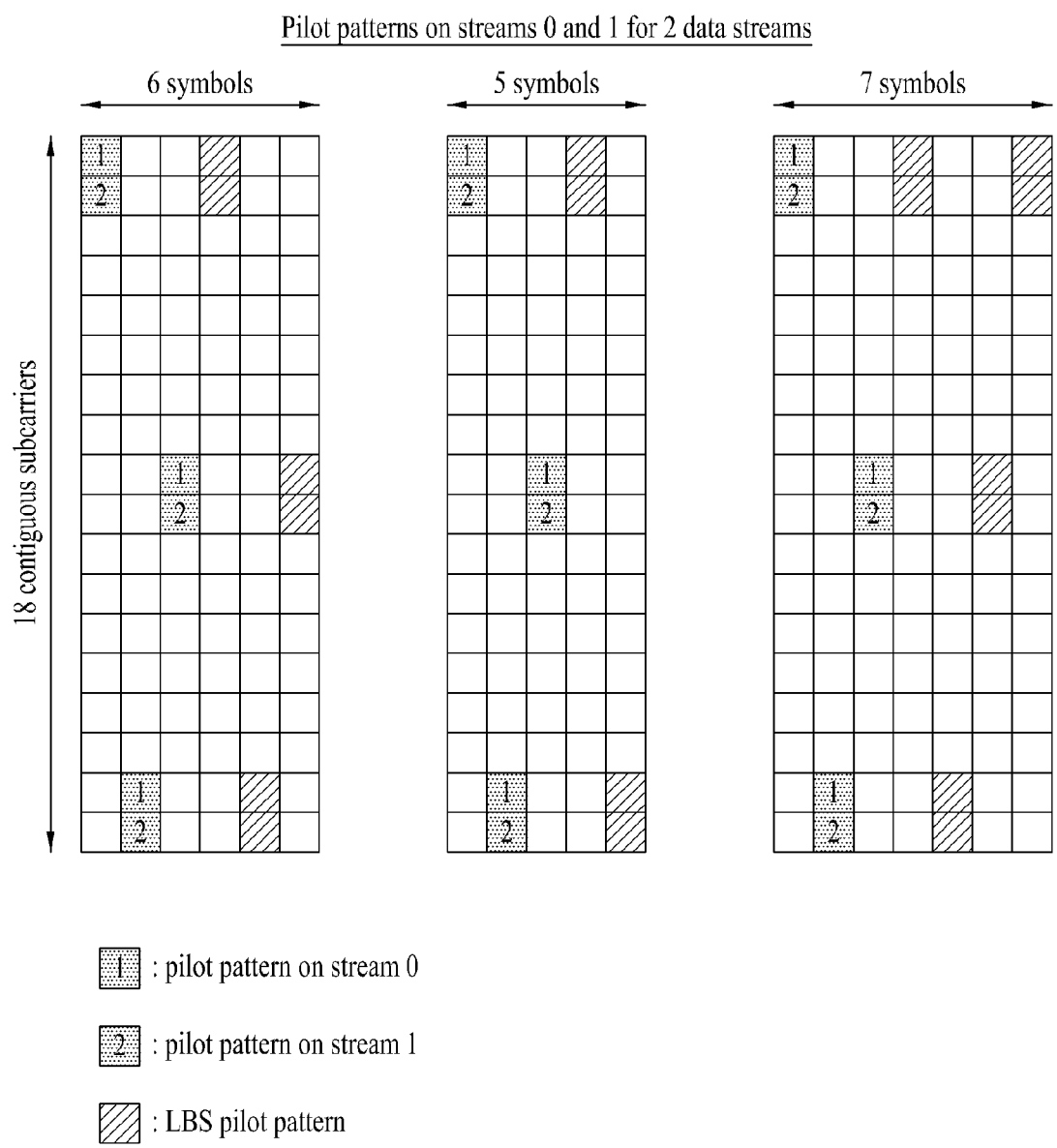
FIGS. 16, 17 and 18 illustrate examples of resource units allocated LBS pilot patterns according to a first embodiment of the present invention to assign LBS pilots.
Figure 17:
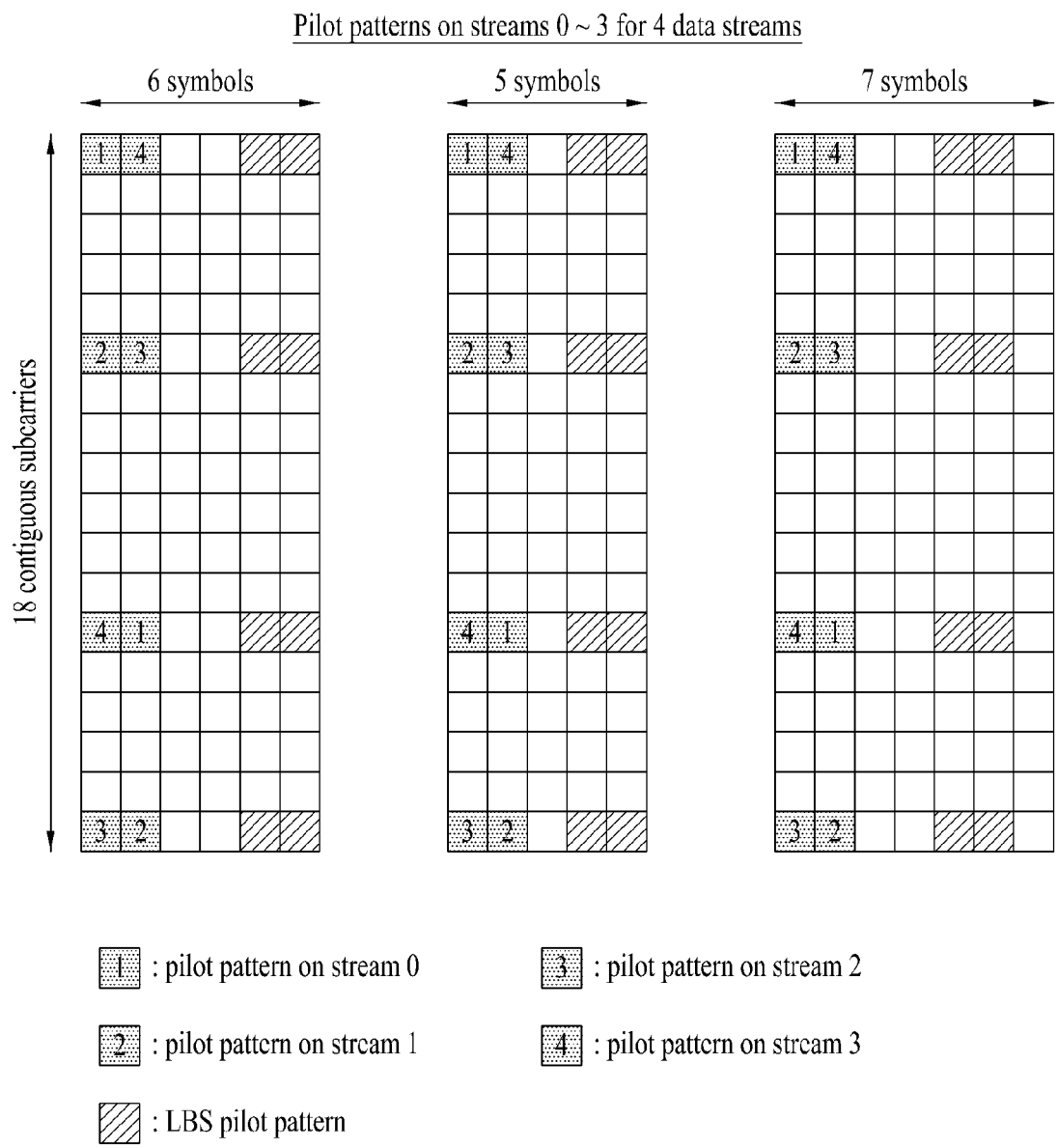
Figure 18:
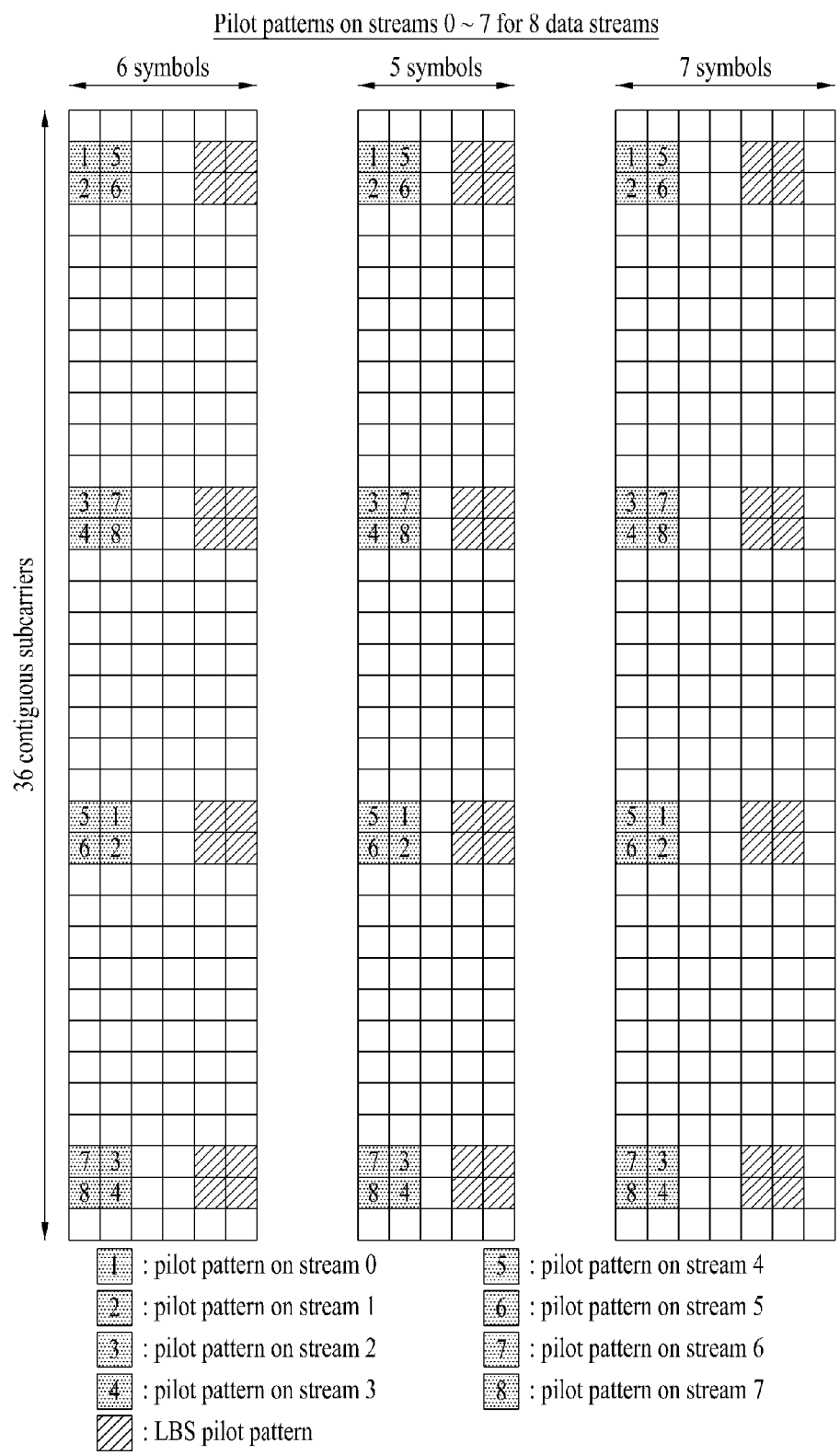

FIGS. 16, 17 and 18 illustrate examples of resource units to which LBS pilot patterns are allocated according to the first embodiment of the present invention for allocating LBS pilots.

FIGS. 16, 17 and 18 show the first embodiment of allocating LBS pilots to location of an existing pilot pattern in repeating OFDMA symbols. FIG. 16 shows an example of allocation of LBS pilot patterns for 2 data streams, FIG. 17 shows an example of allocation of LBS pilot patterns for 4 data streams, and FIG. 18 shows an example of allocation of LBS pilot patterns for 8 data streams.

Referring to FIG. 13, when one subframe includes 6 OFDMA symbols, an existing pilot pattern for 2 data streams is repeated every three OFDMA symbols in a predefined pattern. Referring to FIG. 16, for 2 data streams, a BS can replace existing pilot patterns of three of the 6 OFDMA symbols, for example, fourth, fifth and sixth symbols, with LBS pilot patterns according to the first embodiment of the present invention. That is, the BS according to the first embodiment of the present invention can allocate existing pilot patterns corresponding to three of the 6 OFDMA symbols to the original locations and allocate LBS pilot patterns instead of existing pilot patterns to locations of existing pilot tones corresponding to the remaining 3 OFDMA symbols. When one subframe includes 5 OFDMA symbols, the BS according to the first embodiment of the present invention can replace the existing pilot patterns of the fourth and fifth OFDMA symbols with LBS pilot patterns. That is, the BS according to the first embodiment of the present invention can allocate the existing pilot patterns corresponding to three of the 6 OFDMA symbols to the original locations and allocate LBS pilot patterns instead of the existing pilot patterns to locations of the existing pilot tones corresponding to the remaining 2 OFDMA symbols. In addition, when one subframe includes 7 OFDMA symbols, the BS according to the first embodiment of the present invention can replace existing pilot patterns of the fourth, fifth, sixth and seventh OFDMA symbols or existing pilot patterns of the fifth, sixth and seventh ORDMA symbols with LBS pilot patterns. That is, the BS according to the first embodiment of the present invention can allocate existing pilot patterns corresponding to 3 (or 4) of the 7 OFDMA symbols to the original locations and allocate LBS pilot patterns instead of the existing pilot patterns to locations of the existing pilot tones corresponding to the remaining 4 (or 3) OFDMA symbols.

Referring to FIG. 14, for 4 data streams, existing pilot patterns allocated to the first and second symbols are repeated in the fifth and sixth symbols in the subframe including 6 or 7 OFDMA symbols and repeated in the fourth and fifth symbols in the subframe including 5 OFDMA symbols. Referring to FIG. 17, in allocation of LBS pilot patterns in 4 data streams, the BS according to the first embodiment of the present invention can replace existing pilot patterns allocated to the first and second symbols or existing pilot patterns allocated to the fifth and sixth symbols with LBS pilot patterns in the subframe including 6 or 7 OFDMA symbols. In addition, the BS according to the first embodiment of the present invention can replace existing pilot patterns allocated to the first and second symbols or existing pilot patterns according to the fourth and fifth symbols with LBS pilot patterns in the subframe including 5 OFDMA symbols.

Referring to FIG. 15, for 8 data streams, existing pilot patterns allocated to the first and second symbols are repeated in the fifth and sixth symbols in the subframe including 6 or 7 OFDMA symbols and repeated in the fourth and fifth symbols in the subframe including 5 OFDMA symbols. Referring to FIG. 18, in allocation of LBS pilot patterns in 8 data streams, the BS according to the first embodiment of the present invention can replace existing pilot patterns allocated to the first and second symbols or existing pilot patterns allocated to the fifth and sixth symbols with LBS pilot patterns in the subframe including 6 or 7 OFDMA symbols. In addition, the BS according to the first embodiment of the present invention can replace existing pilot patterns allocated to the first and second symbols or existing pilot patterns according to the fourth and fifth symbols with LBS pilot patterns in the subframe including 5 OFDMA symbols.

Figure 19:
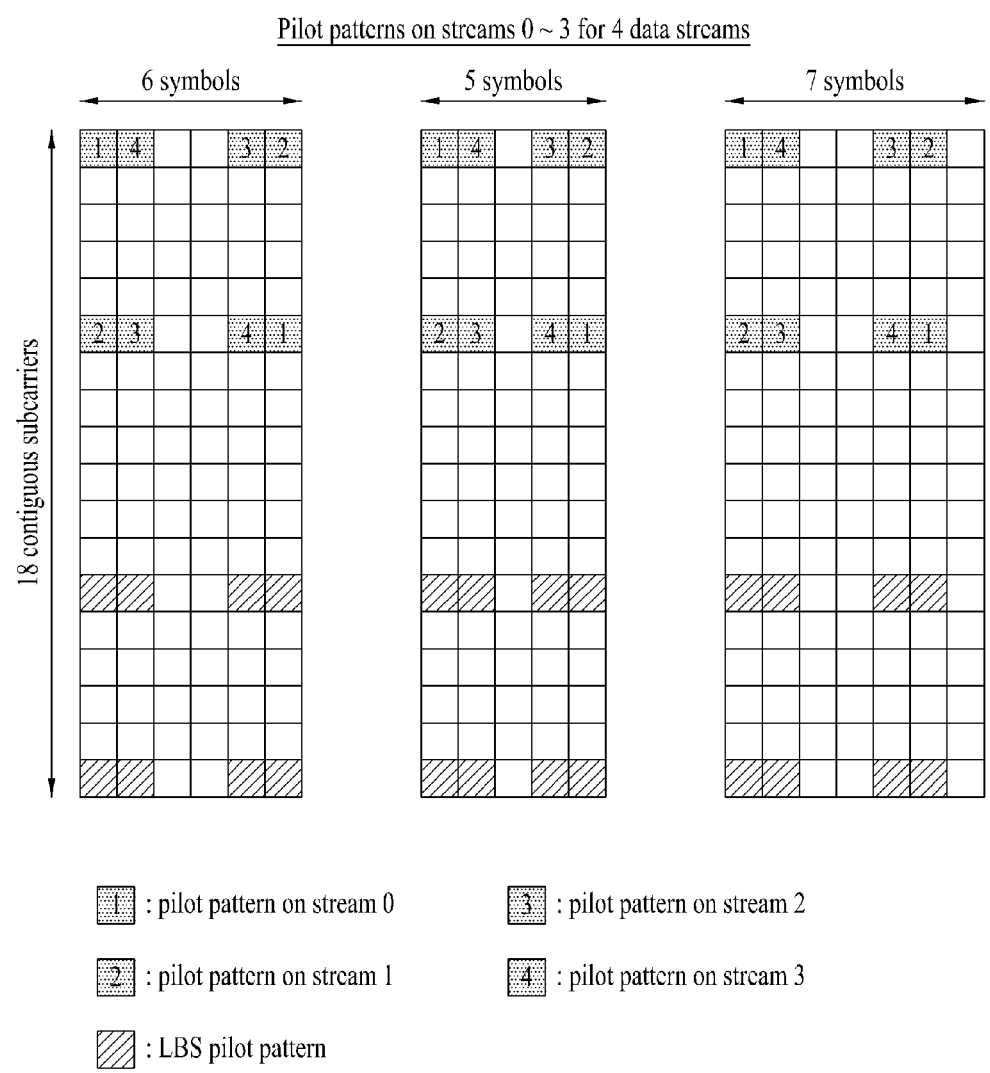
FIGS. 19 and 20 illustrate examples of resource units allocated LBS pilot patterns according to a second embodiment of the present invention to assign LBS pilots.
Figure 20:
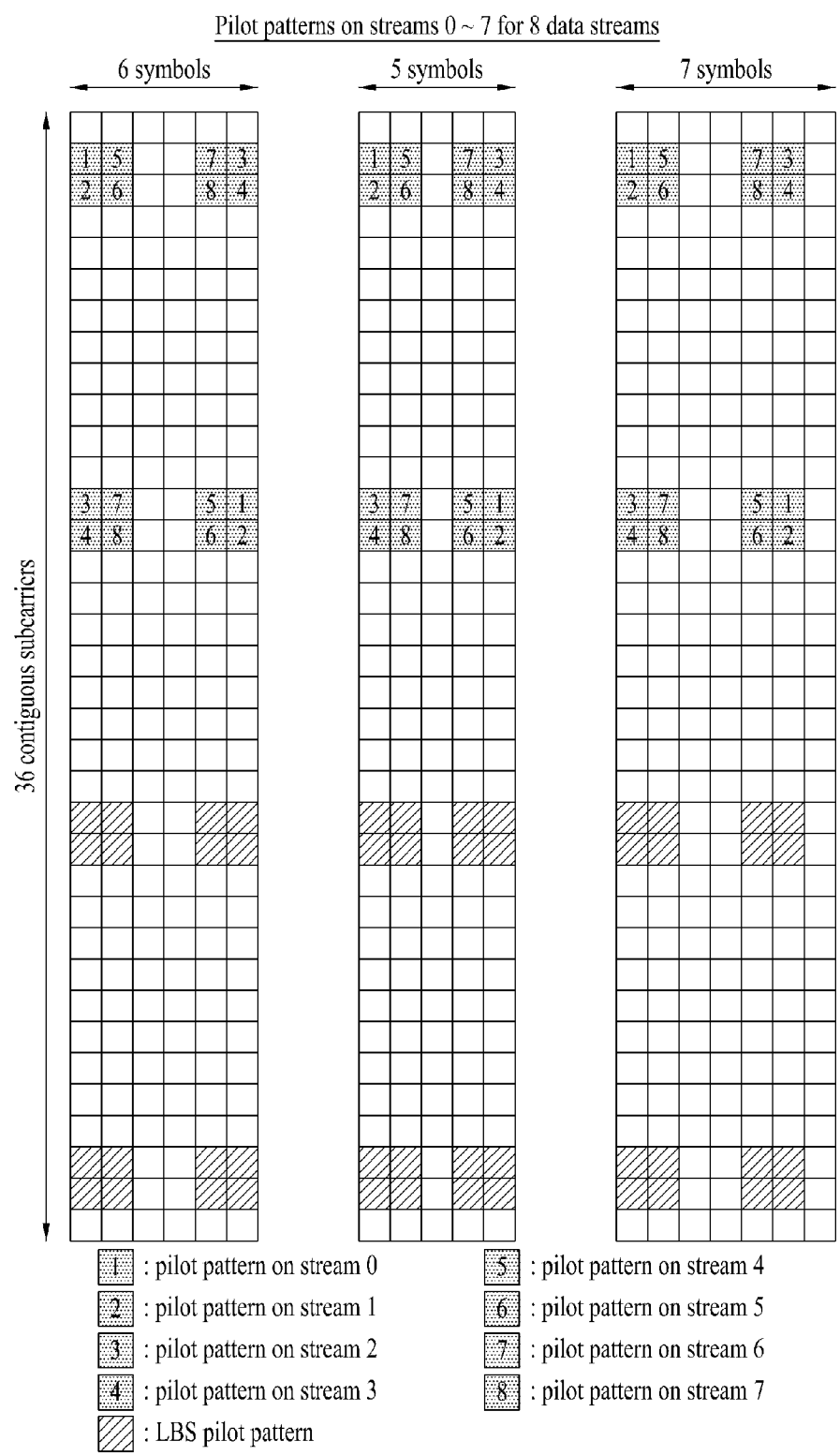

FIGS. 19 and 20 illustrate examples of resource units to which LBS pilot patterns are allocated according to the second embodiment of the present invention for allocating LBS pilots.

FIGS. 19 and 20 illustrate the second embodiment of allocating LBS pilots to existing pilot pattern locations in repeated subcarriers. FIG. 19 shows an example of allocation of LBS pilot patterns for 4 data streams and FIG. 20 shows an example of allocation of LBS pilot patterns for 8 data streams.

Referring to FIG. 14, in 4 data streams, an existing pilot pattern allocated to the first subcarrier is repeated in the eighteenth subcarrier and an existing pilot pattern allocated to the sixth subcarrier is repeated in the thirteenth subcarrier. Referring to FIG. 19, in allocation of LBS pilot patterns in 4 data streams, the BS according to the second embodiment of the present invention can replace the existing pilot patterns allocated to the first and sixth subcarriers or the existing pilot patterns allocated to the thirteenth and eighteenth subcarriers with LBS pilot patterns. Further, the BS can replace the existing pilot patterns allocated to the first and thirteenth subcarriers or the existing pilot patterns allocated to the sixth and eighteenth subcarriers with LBS pilot patterns.

Referring to FIG. 15, in 8 data streams, existing pilot patterns allocated to the second and third subcarriers are repeated in the thirty-fourth and thirty-fifth subcarriers and existing pilot patterns allocated to the thirteenth and fourteenth subcarriers are repeated in the twenty-third and twenty-fourth subcarriers. Referring to FIG. 20, in allocation of LBS pilot patterns in 8 data streams, the BS according to the second embodiment of the present invention can replace the existing pilot patterns allocated to the first and third subcarriers or the existing pilot patterns allocated to the thirty-fourth and thirty-fifth subcarriers with LBS pilot patterns. In addition, the BS can replace the existing pilot patterns allocated to the thirteenth and fourteenth subcarriers or the existing pilot patterns allocated to the twenty-third and twenty-fourth subcarriers with LBS pilot patterns.

Figure 21:
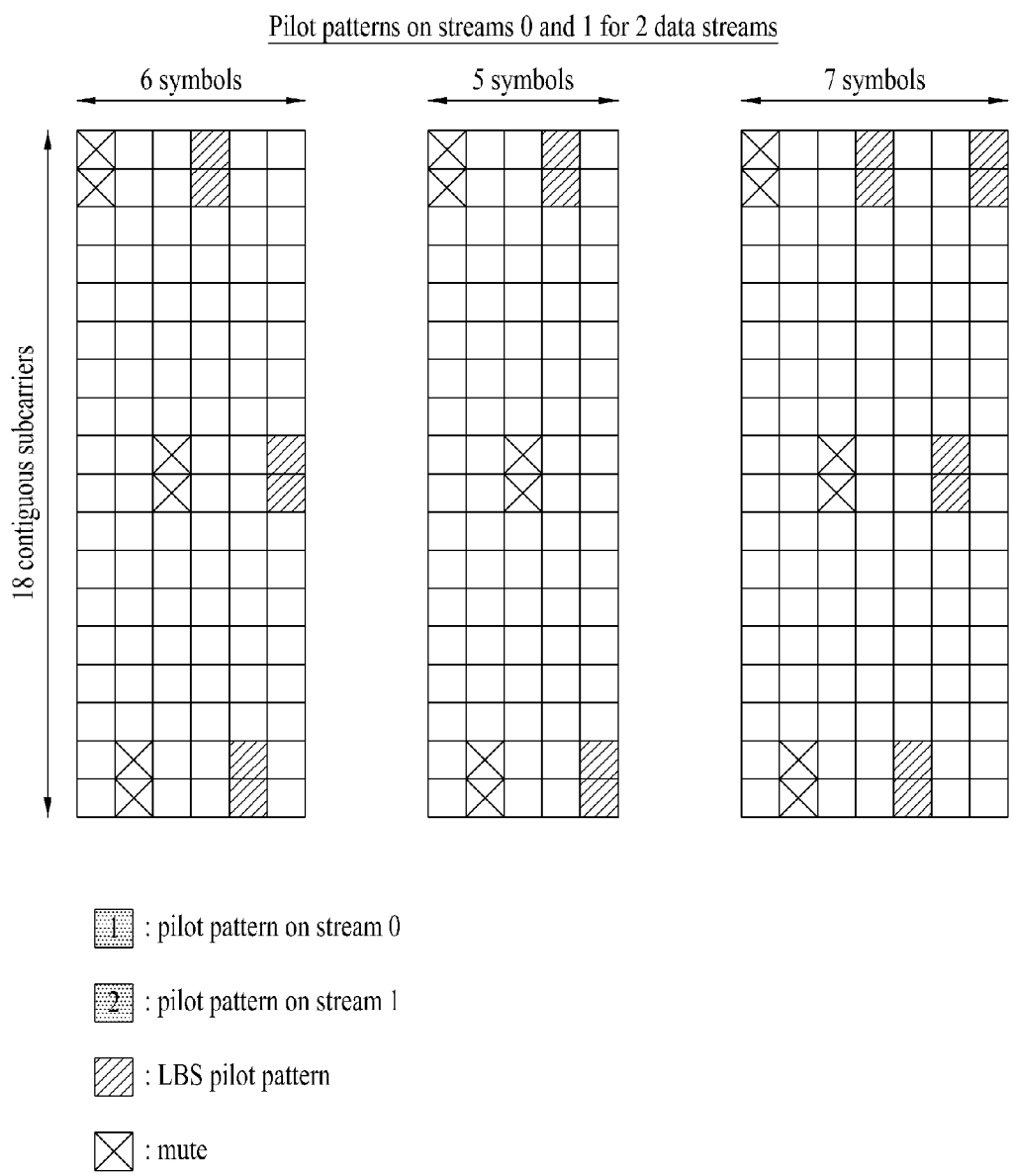
FIGS. 21 and 22 illustrate examples of resource units allocated LBS pilot patterns according to a third embodiment of the present invention to assign LBS pilots.
Figure 22:
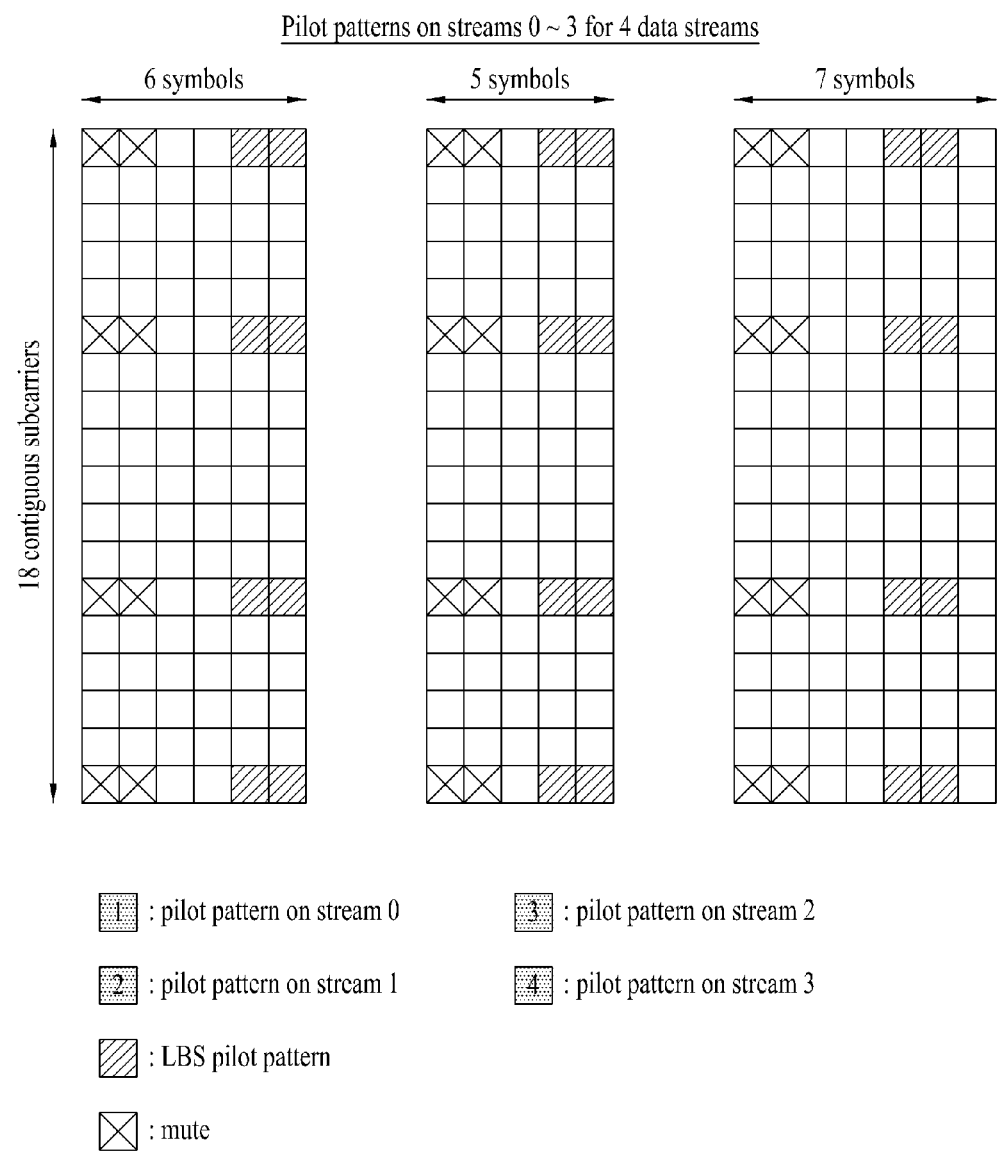

FIGS. 21 and 22 illustrate examples of resource units to which LBS pilot patterns are allocated according to a third embodiment of the present invention for allocating LBS pilots.

Similarly to the first and second embodiments, the third embodiment of the present invention allocates LBS pilots instead of existing pilots to locations of one pilot pattern and/or a multiple of the pilot pattern in OFDMA symbols or subcarriers. However, the third embodiment of the present invention is distinguished from the first and second embodiments in that existing pilot patterns which are not replaced with LBS pilot patterns are muted in PRUs to which the LBS pilot patterns are allocated.

FIG. 21 shows a case in which existing pilot patterns other than LBS pilot patterns among the pilot patterns shown in FIG. 16 are muted and FIG. 22 shows a case in which existing pilot patterns other than LBS pilot patterns among the pilot patterns shown in FIG. 17 are muted. The third embodiment of the present invention can be applied to the examples described in FIGS. 18, 19 and 20, which are not shown.

For reference, FIGS. 16 to 21 show that an LBS pilot pattern occupies the whole of one of existing pilot patterns. However, LBS pilot patterns shown in FIGS. 16 to 21 are merely exemplary. Accordingly, LBS pilots can be allocated to only some resource elements instead of all the resource elements occupied by the existing pilot patterns. For example, if LBS pilots are allocated to the locations of the existing pilot patterns corresponding to the third, fourth and fifth symbols in FIGS. 13 to 16, the BS can replace only one of the pilot stream 1 and pilot stream 2 allocated to the third, fourth and fifth symbols with an LBS pilot stream rather than replacing both the pilot stream 1 and pilot stream 2 with LBS pilot streams.

Figure 23:
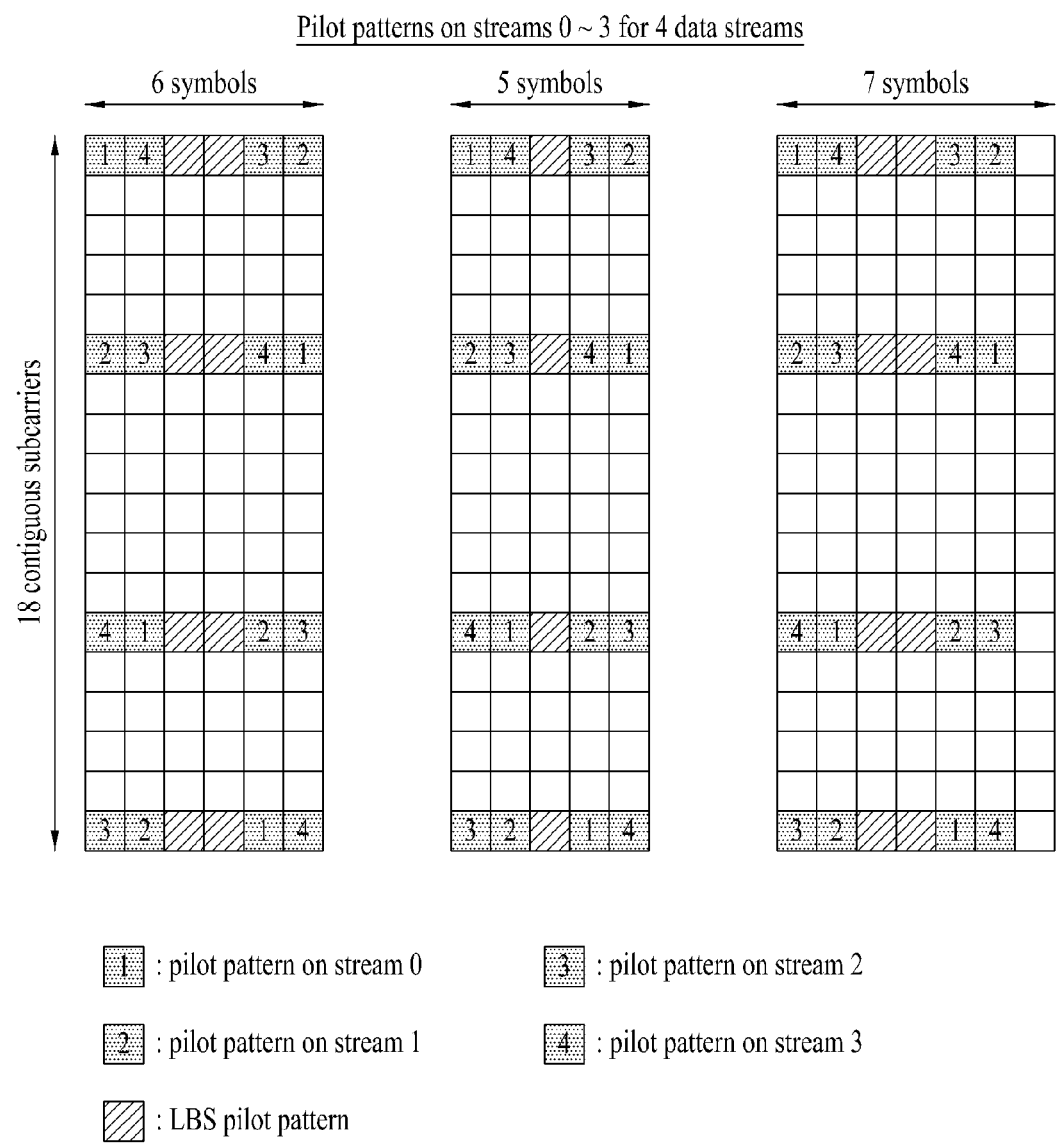
FIGS. 23 and 24 illustrate examples of resource units allocated with LBS pilot patterns according to a fourth embodiment of the present invention to assign LBS pilots.
Figure 24:
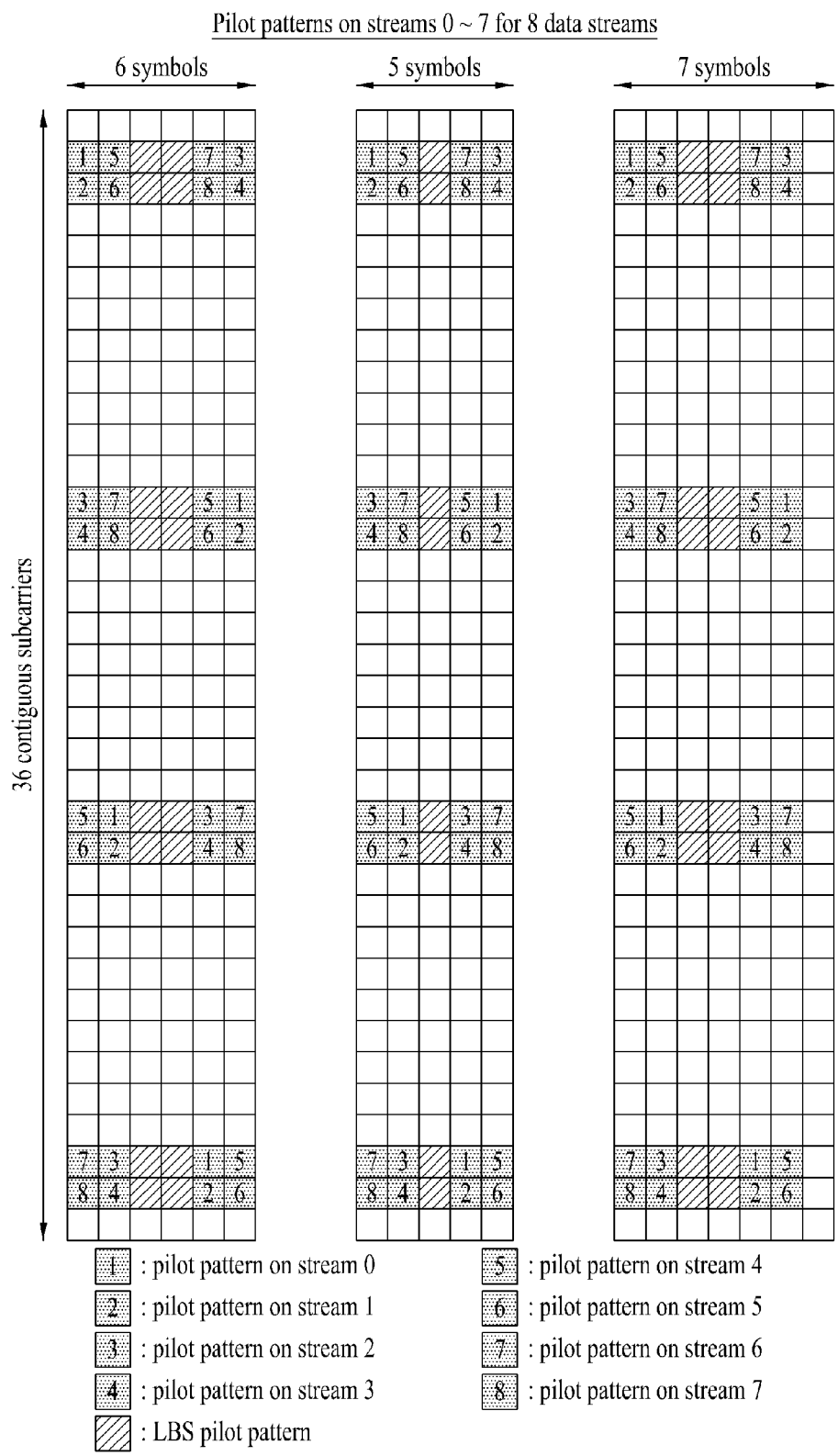

FIGS. 23 and 24 illustrate examples of resource units to which LBS pilot patterns are allocated according to a fourth embodiment of the present invention for allocating LBS pilots.

The aforementioned first, second and third embodiments of the present invention allocate some of existing pilot patterns repeated in predetermined repeating resource units with LBS pilot patterns. The fourth embodiment of the present invention shown in FIGS. 23 and 24 allocates LBS pilot patterns using the fact that 4 data streams or 8 data streams have OFDMA symbols with no allocated channel estimation pilot pattern. Existing pilot patterns for 4 data streams or 8 data streams do not have pilot tones in the third and fourth symbols of a subframe including 6 OFDMA symbols, in the third symbol of a subframe including 5 OFDMA symbols, and in the third, fourth and seventh symbols of a subframe including 7 OFDMA symbols, distinguished from existing pilot patterns for 2 data streams. Accordingly, when symbol(s) having no allocated pilot pattern exist as in 4 data streams or 8 data streams, the BS according to the fourth embodiment of the present invention can allocate LBS pilot patterns to symbol(s) having no pilot tone. FIG. 23 shows an example of allocation of existing pilot patterns and LBS pilot patterns together in 4 data streams, and FIG. 24 shows an example of allocation of existing pilot patterns and LBS pilot patterns together in 8 data streams.

While LBS pilot patterns are allocated to middle symbols among symbols having no allocated LBS pilot patterns in FIGS. 23 and 24, allocation of LBS pilot patterns shown in FIGS. 23 and 24 is exemplary. LBS pilot patterns can be allocated to only some of symbols to which existing pilot patterns are not assigned or respectively allocated to the symbols to which existing pilot patterns are not assigned. For instance, in a subframe including 7 OFDMA symbols, as shown in FIGS. 23 and 24, existing pilot tones are not included in the seventh symbol as well as the third and fourth symbols. Accordingly, the BS according to the fourth embodiment of the present invention can allocate LBS pilot patterns to only some of the third, fourth and seventh symbols of the 7 OFDMA symbols or to all the three symbols.

When LBS pilot patterns are allocated, existing pilot patterns in resource units corresponding to the LBS pilot patterns can be muted as described above, which can be applied to the fourth embodiment of the present invention.

Each of the first to fourth embodiments of the present invention can be combined with each of embodiments A to D and/or each of embodiments I, II, and III described in FIGS. 8 to 12.

Figure 25:
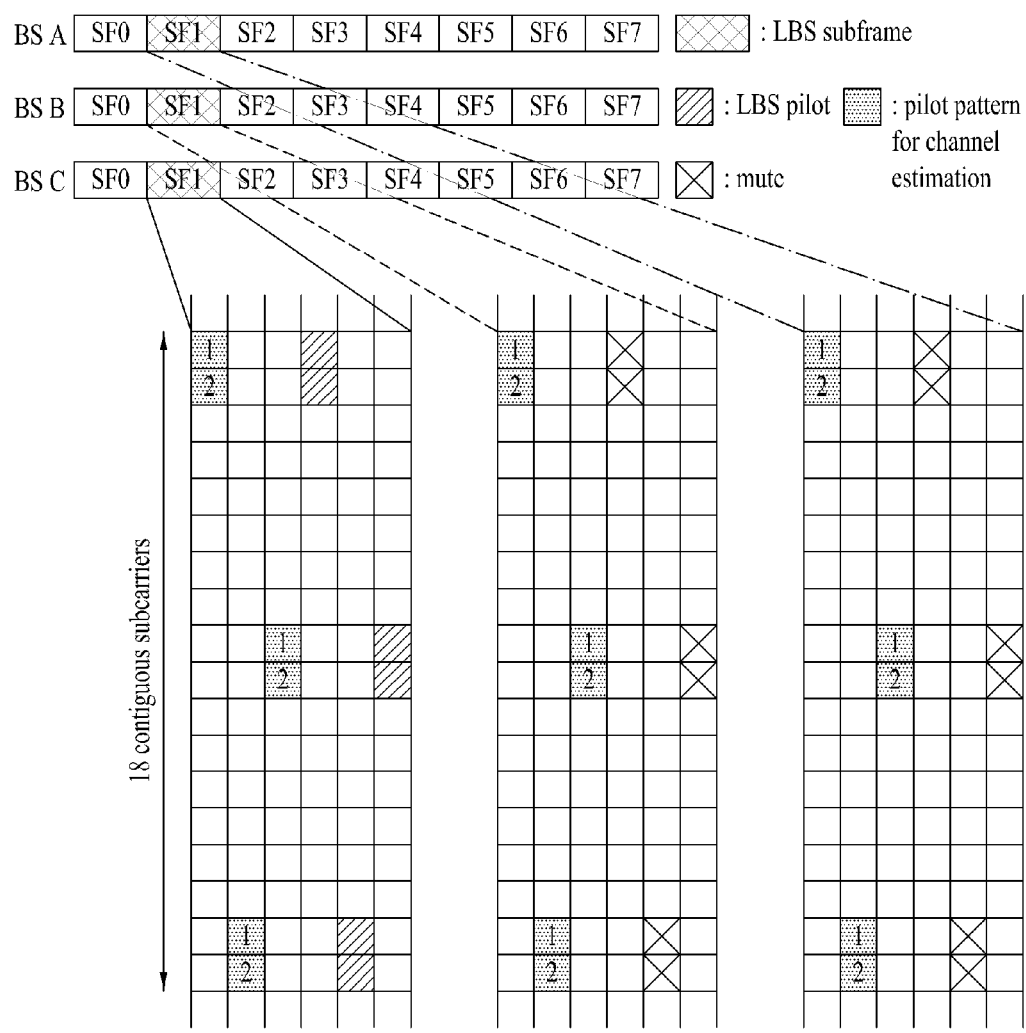
FIGS. 25 and 26 illustrate exemplary interoperations of a plurality of base stations which transmit positioning signals according to embodiments of the present invention.
Figure 26:
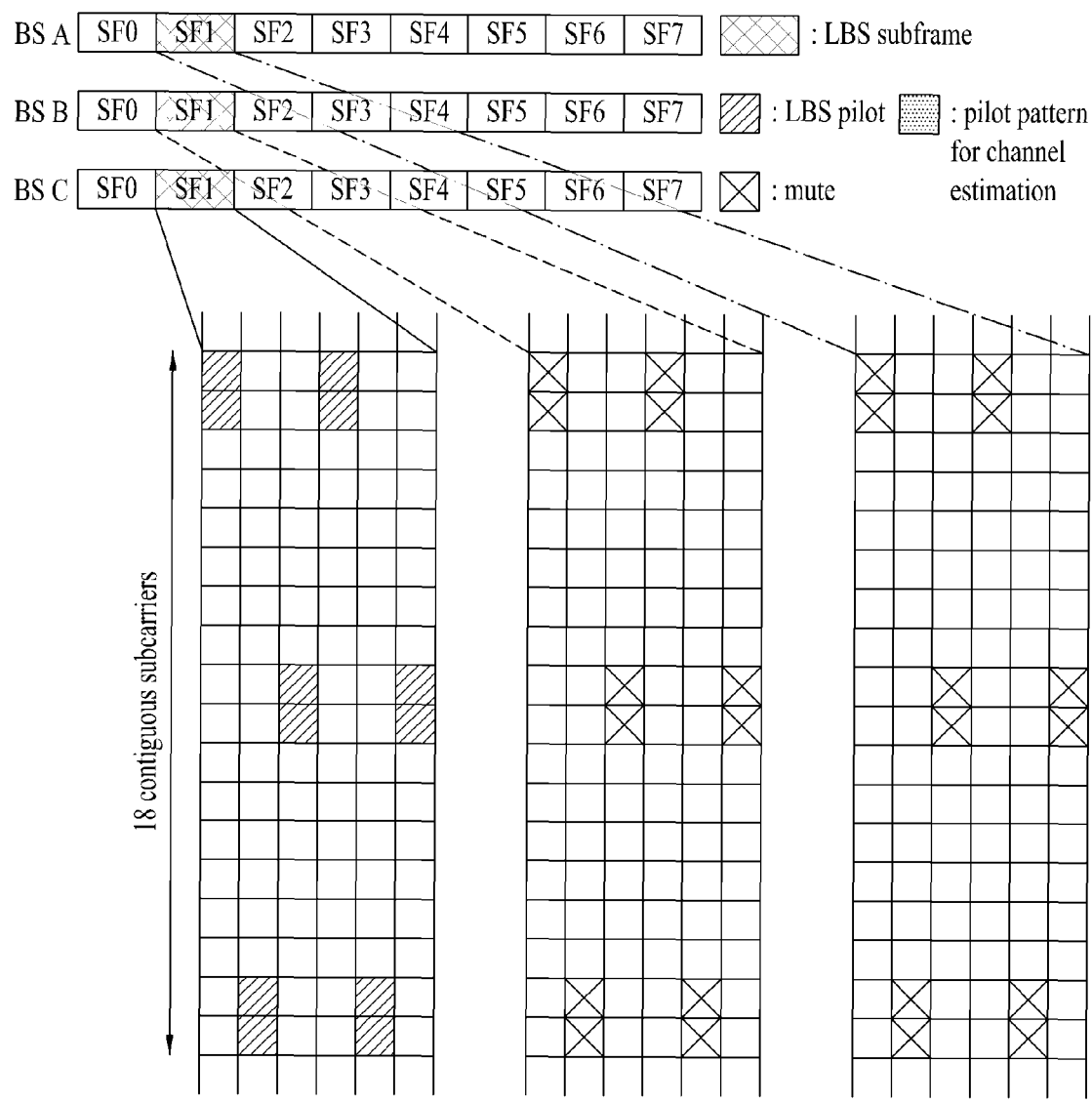

FIGS. 25 and 26 illustrate exemplary interoperations of a plurality of BSs which transmit location measurement signals according to embodiments of the present invention.

A BS can transmit a location measurement signal to UE(s) located in the coverage thereof. Referring to FIG. 1, a UE can receive location measurement signals from BS A, BS B and BS C. At this time, transmission timing of LBS pilots from the BSs A, B and C becomes a problem. When the BSs A, B and C simultaneously transmit LBS pilot signals, the UE is difficult to accurately receive the LBS pilot signals due to interference among the LBS pilot signals. In other words, the UE is difficult to detect signals coming from neighbor cells not a serving cell due to hearability or near-far effect. To allow the UE to accurately detect the signals coming from the neighbor cells at a low interference level, a neighbor cell needs to interrupt transmission of a signal when another neighbor cell transmits an LBS pilot signal, or LBS pilot transmissions of the neighbor cells need to be scheduled in a predetermined pattern.

In the present invention, when a serving BS transmits an LBS subframe, a neighbor BS mutes the whole LBS subframe or resource elements to which LBS pilots are allocated.

Referring to FIG. 25, when BS C of cell C allocates LBS pilots to an LBS subframe and transmits the LBS subframe, BSs A and B of neighbor cells transmit a subframe corresponding to the LBS subframe with resource elements allocated LBS pilot patterns muted in the subframe. At the timing of transmitting LBS pilots by BS A, BS A allocates the LBS pilots to locations of LBS pilot patterns in the LBS subframe and transmits the LBS subframe whereas BSs B and C transmit the corresponding subframe with locations of LBS pilot patterns muted in the corresponding subframe. Similarly, at the timing of transmitting LBS pilots by BS B, the LBS pilots are included in locations of LBS pilot patterns of the LBS subframe transmitted by the BS B whereas locations of LBS pilot patterns of the LBS subframes transmitted by BSs A and C are muted.

FIG. 25 illustrates an example of transmitting LBS subframes by neighbor BSs when pilot patterns are allocated according to the embodiments of FIGS. 16 to 20, 23 and 24 in which LBS pilots and existing channel estimation pilots are transmitted in an LBS subframe. When pilot patterns are allocated according to the embodiments of FIGS. 21 and 22 in which existing channel estimation pilots are muted during LBS subframe transmission, the neighbor BSs may transmit LBS subframes as shown in FIG. 26. That is, when one BS allocates LBS pilots to an LBS subframe and transmits the LBS subframe, neighbor BSs can mute both existing pilots and LBS pilots in corresponding LBS subframes.

If all cells mute LBS pilot patterns and/or existing pilot patterns, LBS performance can be optimized. However, this increases system throughput loss. Accordingly, cells in a predetermined site or in a predetermined range may mute LBS pilot patterns and other cells may transmit LBS pilot patterns according to scheduling among BSs or a transmission scheme. For example, all BSs in a site or tier to which BS C belongs can mute LBS pilot patterns when BS C transmits LBS pilots whereas BSs spaced apart from BS C or BSs belonging to the next tier can transmit LBS pilot patterns without muting them. This is because signals transmitted by BSs sufficiently spaced apart from BS C less interfere with a signal transmitted by BS C.

A description will be given of operations of a BS which transmits LBS pilots and a UE which receives the LBS pilots to perform location measurement according to one of the embodiments of the present invention with reference to FIGS. 2 and 3.

A BS processor 400b of the present invention can select a subframe which will transmit an LBS pilot according to one of the embodiments of setting an LBS subframe, described above with reference to FIGS. 5, 6 and 7. In other words, the BS processor 400b can be configured to set an LBS subframe according to one of the embodiments described in IFGS. 5, 6 and 7. The BS processor 400b can generate an SFH or a MAC management message, which includes information indicating the location and/or transmission interval of the LBS subframe. A BS transmitter 100b can broadcast the SFH or MAC management message under the control of the BS processor 400b.

The BS processor 400b can control the BS transmitter 100b to allocate LBS pilots to all or some resource units of the LBS subframe according to one of the aforementioned embodiments A to D and embodiments I, II and III of the present invention. For example, the BS processor 400b according to embodiment A can control the BS transmitter 100b to use all the resource units belonging to the LBS subframe for LBS pilot transmission. The BS processor 400b according to one of embodiments B, C and D and embodiments I, II and III can control the BS transmitter 100b to use resource units belonging to part of a symbol interval and/or part of a frequency interval of the LBS subframe for LBS pilot transmission.

A subcarrier mappers 130-1 to 130-K can be configured to allocate LBS pilots to subcarriers of resource units determined according to one of embodiments A to D and embodiments I, II and III of the present invention.

In allocation of LBS pilots to resource units belonging to an LBS pilot region in an LBS subframe according to one of embodiments A to D and embodiments I, II and III of the present invention, the BS processor 400b can control the BS transmitter 100b to allocate LBS pilots according to one of the first to fourth embodiments of the present invention. In allocation of LBS pilots to one resource unit in the LBS subframe, the subcarrier mappers 130-1 to 130-K can allocate the LBS pilots to subcarrier(s) in the resource unit according to one of the first to fourth embodiments of the present invention. The BS processor 400b can generate an SFH or a MAC management message such that it can include information on resource units and/or subbands and minibands to which LBS pilots are allocated. The BS transmitter 100b can broadcast the information on the resource units and/or subband and minibands to which LBS pilots are allocated under the control of the BS processor 400b.

When a neighbor cell transmits an LBS subframe allocated LBS pilots, the BS processor 400b can control the BS transmitter 100b to mute resource elements in the LBS subframe, which will be occupied by the LBS pilots, in order to reduce interference of a signal of a cell including the BS processor 400b on a signal of the neighbor cell. The subcarrier mappers 130-1 to 130-K can mute LBS pilot patterns in the LBS subframe under the control of the BS processor 400b.

A UE can receive at least one LBS subframe from each of a plurality of cells and measure the location of the UE on the basis of LBS pilots transmitted thereto through the LBS subframe. For example, the UE can measure delays of LBS pilots received from the cells using a difference among arrival timings of the LBS pilots transmitted from the cells. The UE can determine the location thereof based on the delays of the LBS pilots. Alternatively, the UE can calculate a transmission time difference and/or a receiving time difference among LBS pilots in a plurality of LBS subframes received from a plurality of cells. The UE can determine the location thereof in a wireless communication on the basis of the transmission time difference and/or receiving time difference.

Referring to FIGS. 2 and 3, a UE receiver 300a receives LBS subframes from cells in proximity thereto according to the above-mentioned embodiments of the present invention and transfers the LBS subframes to a UE processor 400a. The UE can include a pilot measurement module which measures LBS pilot signals included in the received LBS subframes for location measurement using LBS pilots. The pilot measurement module can be implemented such that it is included in the UE receiver 300a or the UE processor 400a, or implemented as a separate independent module.

The UE processor 400a can be configured to measure transmission timings and arrival timings of LBS pilots in a plurality of LBS subframes respectively received from a plurality of cells on the basis of the LBS pilots. The UE processor 400a can calculate distances from the cells which have transmitted the LBS subframes arrived at the UE on the basis of the measured timing values. For example, the UE processor 400a can be configured to calculate the location of the UE in the wireless communication system using delays of LBS pilots included in a plurality of subframes received by the UE. Alternatively, the UE processor 400a can calculate the location of the UE by calculating a transmission time difference and/or a receiving time difference among the LBS pilots. The UE processor 400a can feed back information on the location of the UE to BSs of the cells which have transmitted the LBS subframes received by the UE.

Alternatively, the UE processor 400a can generate feedback information from a signal magnitude, a transmission/arrival timing value, or a delay value calculated based on the LBS pilots, and control the UE transmitter 100a to transmit the feedback information. For instance, the UE processor 400a can calculate a transmission/receiving time difference among LBS pilots received from neighbor cells or delays of the LBS pilots from the neighbor cells, transmitted to the UE, and control the UE transmitter 100 to feedback the calculated result to the neighbor cells. The BS processor 400b of each of cells participating in measurement of the location of the UE can be configured to determine the location of the UE on the basis of the feedback information transmitted from the UE.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

[Industrial Applicability]

The embodiments of the present invention can be applied to a base station, a mobile station, or other communication device in a wireless communication system.

The invention claimed is:

1. A method for transmitting, by a base station, a location measurement pilot for location based services in a wireless communication system, the method comprising:

transmitting a channel estimation pilot according to a predefined pilot pattern for the channel estimation pilot in a subframe other than a location measurement subframe configured for transmission of the location measurement pilot, and transmitting the location measurement pilot and the channel estimation pilot in the location measurement subframe; and wherein the location measurement pilot is transmitted instead of the channel estimation pilot at a part of the predefined pilot pattern on at least one frequency resource unit in the location measurement subframe, and wherein the location measurement subframe is other than a subframe with a superframe header which is transmitted at a first subframe of each superframe which includes four frames each of which includes a plurality of subframes.

2. The method according to claim 1, wherein the at least one frequency resource unit on which the location measurement pilot is transmitted is other than a frequency resource unit occupied by an advanced MAP carrying control information in the location measurement subframe.

3. The method according to claim 2, further comprising:

muting a time-frequency resource to which a location measurement pilot of a neighbor cell is allocated in the location measurement subframe when a base station of the neighbor cell transmits the location measurement pilot of the neighbor cell.

4. A base station for transmitting a location measurement pilot for location based services in a wireless communication system, the base station comprising:

a transmitter configured to transmit a radio signal; and a processor configured to control the transmitter to transmit a channel estimation pilot according to a predefined pilot pattern for the channel estimation pilot in a subframe other than a location measurement subframe configured for transmission of the location measurement pilot and to control the transmitter to transmit the location measurement pilot and the channel estimation pilot in the location measurement subframe, wherein the processor controls the transmitter to transmit the location measurement pilot instead of the channel estimation pilot at a part of the predefined pilot pattern on at least one frequency resource unit in the location measurement subframe, and wherein the location measurement subframe is other than a subframe with a superframe header which is transmitted at a first subframe of each superframe which includes four frames each of which includes a plurality of subframes.

5. The base station according to claim 4, wherein the at least one of frequency resource units on which the location measure pilot is transmitted is other than a frequency resource unit occupied by an advanced MAP carrying control information in the location measurement subframe.

6. The base station according to claim 5, wherein the processor is configured to control the transmitter to mute a time-frequency resource to which a location measurement pilot of a neighbor cell is allocated in the location measurement subframe when a base station of the neighbor cell transmits the location measurement pilot of the neighbor cell.

7. A method for receiving by a user equipment (UE), a location measurement pilot for location based services in a wireless communication system, the method comprising:

receiving a channel estimation pilot according to a predefined pilot pattern for the channel estimation pilot in a subframe other than a location measurement subframe configured for reception of the location measurement pilot; and receiving the location measurement pilot and the channel estimation pilot in the location measurement subframe, wherein the location measurement pilot is the channel estimation pilot at a part of the predefined pilot pattern on at least one frequency resource unit in the location measurement subframe, and wherein the location measurement subframe is other than a subframe with a superframe header which is received at a first subframe of each superframe which includes four frames each of which includes a plurality of subframes.

8. The method according to claim 7, wherein the at least one frequency resource unit on which the location measurement pilot is received is other than a control region frequency resource unit occupied by an advanced MAP carrying control information in the location measurement subframe.

9. A user equipment (UE) comprising:

a receiver configured to receive a radio signal; and a processor configured to control the receiver to receive a channel estimation pilot according to a predefined pilot pattern for the channel estimation pilot in a subframe other than a location measurement subframe configured for reception of the location measurement pilot, and to control the receiver to receive the location measurement pilot and the channel estimation pilot in the location measurement subframe, wherein the location measurement pilot is received instead of the channel estimation pilot at a part of the predefined pilot pattern on at least one frequency resource unit in the location measurement subframe; and wherein the location measurement subframe is other than a subframe with a superframe header which is received at a first subframe of each superframe which includes four frames each of which includes a plurality of subframes.

10. The UE according to claim 9, wherein the at least one frequency resource unit on which the location measurement pilot is received is other than a frequency resource unit occupied by an advanced MAP carrying control information in the location measurement subframe.

11. The method according to claim 1, wherein the part of the predefined pilot pattern is part of the OFDM symbols used for the predefined pilot pattern.

12. The method according to claim 4, wherein the part of the predefined pilot pattern is part of the OFDM symbols used for the predefined pilot pattern.

13. The method according to claim 7, wherein the part of the predefined pilot pattern is part of the OFDM symbols used for the predefined pilot pattern.

14. The method according to claim 9, wherein the part of the predefined pilot pattern is part of the OFDM symbols used for the predefined pilot pattern.

\* \* \* \* \*